US012637388B2

(12) United States Patent
Dejneka et al.

(10) Patent No.: US 12,637,388 B2
(45) Date of Patent: May 26, 2026

(54) GLASS-CERAMIC ARTICLES WITH HIGH DYNAMIC RANGE TRANSMITTANCE VIA LASER BLEACHING

(71) Applicant: CORNING INCORPORATED, Corning, NY (US)

(72) Inventors: Matthew John Dejneka, Corning, NY (US); Jesse Kohl, Horseheads, NY (US); Alexander Mikhailovich Streltsov, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 835 days.

(21) Appl. No.: 17/940,515

(22) Filed: Sep. 8, 2022

(65) Prior Publication Data

US 2023/0092019 A1     Mar. 23, 2023

Related U.S. Application Data

(60) Provisional application No. 63/243,199, filed on Sep. 12, 2021.

(51) Int. Cl.
| | |
|---|---|
| *C03C 23/00* | (2006.01) |
| *C03C 10/00* | (2006.01) |
| *C03C 21/00* | (2006.01) |

(52) U.S. Cl.
CPC ...... *C03C 23/0025* (2013.01); *C03C 10/0027* (2013.01); *C03C 10/0054* (2013.01); *C03C 21/002* (2013.01); *C03C 2214/20* (2013.01)

(58) Field of Classification Search
None
See application file for complete search history.

(56) References Cited

U.S. PATENT DOCUMENTS

| | | | |
|---|---|---|---|
| 457,106 | A | 8/1891 | Boynton |
| 3,293,052 | A | 12/1966 | Sawchuk et al. |
| 3,457,106 | A | 7/1969 | Gillery |
| 3,499,775 | A | 3/1970 | Turner et al. |

(Continued)

FOREIGN PATENT DOCUMENTS

| | | |
|---|---|---|
| AU | 2003214255 A1 | 12/2003 |
| CN | 1210124 A | 3/1999 |

(Continued)

OTHER PUBLICATIONS

Translation of DE-102010023407-A1 (Year: 2011).*

(Continued)

*Primary Examiner* — Elizabeth M Kerr
(74) *Attorney, Agent, or Firm* — Russell S. Magaziner

(57) ABSTRACT

An article includes a glass ceramic that has an amorphous silicate glass phase and a crystalline phase including a species of MxWO3 with 0<x<1 and M an intercalated dopant cation. The article further includes an aperture configured to be formed via local heating of a portion of the glass ceramic to a temperature that is above the softening point of the glass ceramic. The aperture comprises constituents of the silicate glass phase and the crystalline phase but is substantially free of the species of MxWO3. A ratio of a transmittance of the aperture to a transmittance of the glass ceramic not subject to the local heating is at least 6,000 with transmittance measured in %/mm at wavelengths from 500 nm to 1100 nm.

13 Claims, 15 Drawing Sheets

(56) References Cited

U.S. PATENT DOCUMENTS

| | | | |
|---|---|---|---|
| 3,788,865 A | 1/1974 | Busdiecker et al. | |
| 3,985,534 A | 10/1976 | Flannery et al. | |
| 4,075,024 A | 2/1978 | Armistead | |
| 4,240,836 A | 12/1980 | Borrelli et al. | |
| 4,303,298 A | 12/1981 | Yamashita | |
| 4,829,365 A | 5/1989 | Eichenlaub | |
| 5,393,593 A | 2/1995 | Gulotta et al. | |
| 5,565,388 A | 10/1996 | Krumwiede et al. | |
| 5,566,428 A | 10/1996 | Takahashi | |
| 5,668,066 A | 9/1997 | Oguma et al. | |
| 6,048,621 A | 4/2000 | Gallego et al. | |
| 6,114,264 A | 9/2000 | Krumwiede et al. | |
| 6,196,027 B1 | 3/2001 | Varanasi et al. | |
| 6,238,847 B1 * | 5/2001 | Axtell, III | C03C 23/0025 427/559 |
| 6,274,523 B1 | 8/2001 | Krumwiede et al. | |
| 6,911,254 B2 | 6/2005 | Fisher et al. | |
| 7,192,897 B2 | 3/2007 | Yamane et al. | |
| 7,517,822 B2 | 4/2009 | Fechner et al. | |
| 7,675,001 B2 | 3/2010 | Leyvraz | |
| 8,872,870 B2 | 10/2014 | Witzmann et al. | |
| 9,403,716 B2 | 8/2016 | Dejneka et al. | |
| 10,246,371 B1 | 4/2019 | Dejneka et al. | |
| 10,365,499 B2 | 7/2019 | Schaur et al. | |
| 10,370,291 B2 | 8/2019 | Dejneka et al. | |
| 10,450,220 B2 | 10/2019 | Dejneka et al. | |
| 10,807,906 B2 | 10/2020 | Dejneka et al. | |
| 10,829,408 B2 | 11/2020 | Dejneka et al. | |
| 11,046,609 B2 | 6/2021 | Dejneka et al. | |
| 11,053,159 B2 | 7/2021 | Dejneka et al. | |
| 11,312,653 B2 | 4/2022 | Dejneka et al. | |
| 11,351,756 B2 | 6/2022 | Dejneka et al. | |
| 11,746,041 B2 | 9/2023 | Dejneka et al. | |
| 2002/0072461 A1 | 6/2002 | Akimoto et al. | |
| 2003/0122844 A1 | 7/2003 | Mueller et al. | |
| 2005/0025182 A1 | 2/2005 | Nazari | |
| 2005/0094266 A1 | 5/2005 | Liu et al. | |
| 2005/0151116 A1 | 7/2005 | Fechner et al. | |
| 2008/0193686 A1 | 8/2008 | Loergen et al. | |
| 2009/0035341 A1 | 2/2009 | Wagener et al. | |
| 2009/0062102 A1 | 3/2009 | Borrelli et al. | |
| 2014/0087194 A1 * | 3/2014 | Dejneka | C03C 21/002 65/30.14 |
| 2014/0256865 A1 | 9/2014 | Boulton et al. | |
| 2014/0305929 A1 * | 10/2014 | Weiss | C03C 4/10 219/460.1 |
| 2015/0093554 A1 * | 4/2015 | Estinto | B23K 26/02 428/210 |
| 2015/0239772 A1 | 8/2015 | Baker et al. | |
| 2016/0031755 A1 | 2/2016 | Hoppe et al. | |
| 2017/0261765 A1 | 9/2017 | Dangelmaier et al. | |
| 2017/0362119 A1 | 12/2017 | Dejneka et al. | |
| 2018/0170804 A1 | 6/2018 | Trinks et al. | |
| 2018/0273419 A1 | 9/2018 | Annamalai et al. | |
| 2019/0177206 A1 | 6/2019 | Dejneka et al. | |
| 2019/0177209 A1 | 6/2019 | Dejneka et al. | |
| 2019/0177211 A1 | 6/2019 | Dejneka et al. | |
| 2019/0177212 A1 | 6/2019 | Dejneka et al. | |
| 2019/0256408 A1 | 8/2019 | Dejneka et al. | |
| 2020/0002220 A1 | 1/2020 | Dejneka et al. | |
| 2020/0255327 A1 | 8/2020 | Dejneka et al. | |
| 2020/0399167 A1 | 12/2020 | Dejneka et al. | |
| 2020/0399168 A1 | 12/2020 | Dejneka et al. | |
| 2021/0070018 A1 | 3/2021 | Dejneka et al. | |
| 2021/0284572 A1 | 9/2021 | Dejneka et al. | |
| 2022/0009823 A1 | 1/2022 | Dejneka et al. | |
| 2022/0162114 A1 | 5/2022 | Dejneka et al. | |
| 2022/0258455 A1 | 8/2022 | Dejneka et al. | |

FOREIGN PATENT DOCUMENTS

| | | | | |
|---|---|---|---|---|
| CN | 1653007 A | 8/2005 | | |
| DE | 10353756 A1 | 6/2005 | | |
| DE | 102010023407 A1 * | 12/2011 | | H10F 77/1696 |
| EP | 1705161 A1 | 9/2006 | | |
| EP | 1974848 A1 | 10/2008 | | |
| EP | 2581353 A1 | 4/2013 | | |
| KR | 10-1061056 B1 | 9/2011 | | |
| TW | 264422 B | 12/1995 | | |
| WO | 03/97544 A1 | 11/2003 | | |
| WO | 2013/180349 A1 | 12/2013 | | |
| WO | 2017/054779 A1 | 4/2017 | | |
| WO | 2017/180811 A1 | 10/2017 | | |
| WO | 2017/218859 A1 | 12/2017 | | |
| WO | WO-2019051408 A2 * | 3/2019 | | C03C 10/0009 |
| WO | 2019/113029 A1 | 6/2019 | | |
| WO | 2021/183281 A1 | 9/2021 | | |

OTHER PUBLICATIONS

W. A. Weyl, "Coloured Glasses", Society of Glass Technology, 1951.

Z. Hussain, "Optical and Electrochromic Properties of Annealed Lithium-Molybdenum-Bronze Thin Films," J. Electronics Materials, vol. 31 [6], 2002.

Zeng et al., "The preparation of a high performance near-infrared shielding CsxWO3/SiO2 composite resin coating and research on its optical stability under ultraviolet illumination," J. Mater. Chem. C, vol. 3, 2015, pp. 8050-8060.

Zeng et al; "The Preparation of a High Perfomance Near-Infrared Shielding CSxW03/Si02 Composite Resin Coating and Research on Its Optical Stability Under Ultraviolet Illumination"; Journal of Materials Chemistry C; 2015, 3, pp. 8050-8060.

"Radio and Microwave Frequency Attenuation in Glass," PPG Glass Technical Document, TD-151, PPG Industries. Inc., 2016, 5 pages; https://www.vitroglazings.com/media/1/1k3zcc/vitro-td-151.pdf.

Adachi et al., "Chromatic instabilities in cesium-doped tungsten bronze nanoparticles," J. Appl. Phys., 115 194304 (2013).

Autos, "Supersizing the Sunroof, Even in Economy Cars" , The Wall Street Journal, Available Online <https://web.archive.org/web/20180329041836/https://www.wsj.com/articles/SB10001424127887324024004578173271481039256>Dec. 2012, 1 page.

Autover, "Thermocontrol Venus", Saint Gobian, Available Online <https://web.archive.org/web/20191227224530/http://www.saint-gobain-autover.com/thermocontrol-venus-for-auto-glass> Retrieved on Dec. 27, 2019, 1 page.

AxleGeeks, "Compare Cars with Panorama Sunroof", Available Online <https://web.archive.org/web/20150919055004/http://cars.axlegeeks.com/d/x/Panorama-Sunroof> Retrieved on Sep. 19, 2015, pp. 4.

Cameo Glass; Britannica Online Encyclopedia; 2 Pages; 2018.

Chen et al., "Preparation and near-infrared photothermal conversion property of cesium tungsten oxide nanoparticles," Nanoscale Res. Lett., 8, 57 (2013).

Dejneka et al; "Articles Including Glass and/or Glass-Ceramics and Methods of Making the Same" Filed as U.S. Appl. No. 15/840,040, filed Dec. 13, 2017; 42 Pages.

Dejneka et al; "Devices With Bleached Discrete Region and Methods of Manufacture" Filed as PCT/US2018/050258 On Sep. 10, 2018 59.

Dejneka et al; "Glass-Ceramics and Glass-Ceramic Articles With UV- and NIR-Blocking Characteristics"; Filed as PCT/US2018/063792 on Dec. 4, 2018; 65 Pages.

Dejneka et al; "Glass-Ceramics and Glasses"; Filed As U.S. Appl. No. 16/171,939, filed Oct. 26, 2018; 106 Pages.

Dejneka et al; "Glass-Ceramics and Methods of Making the Same" Filed as U.S. Appl. No. 16/190,297, filed Nov. 14, 2018; 62 Pages.

Dickens et al., "The Tungsten Bronzes and Related Compounds," J. Amer. Chem. Soc., 81, 5556 (1981).

Efficient Windows Collaborative, "Window Technologies: Low-E Coatings" Available Online at<https://web.archive.org/web/20190110014050/https://www.efficientwindows.org/lowe.php>, Jan. 2019, 3 pages.

(56)        References Cited

OTHER PUBLICATIONS

El-Sayed et al; "Some Properties of Sodium Tungsten Bronzes as a Function of Sodium Concentration", Indian Journal of Chem. Tech., 12, 204 (2005).

Global Marketing Insights, "Market research reports, Latest Published Report", Available Online <https://web.archive.org/web/20200929082752/https://www.gminsights.com/> Retrieved on Sep. 29, 2020, pp. 6.

Green et al, "Optical Properties of Lithium Tungsten Bronze Thin Films", J. Appl. Phys. 81, 3592 (1997).

Green et al., "Optical properties of dilute hydrogen tungsten bronze thin films," J. Appl. Phys. 74, 3451 (1993).

Guo et al., "Highly efficient ablation of metastatic breast cancer using ammonium-tungsten-bronze nanocube as a novel 1064 nm laser-driven photothermal agent," Biomaterials 52, 407-416 (2015).

Hussain, "Optical and Electrochromic Properties of Annealed Lithium-Molybdenum-Bronze Thin Films", J. Electronics Materials, vol. 31 [6], 2002.

Informine, "Molybdenum Prices and Molybdenum Price Charts", Available Online at <https://web.archive.org/web/20190213135842/http://www.infomine.com/investment/metal-prices/molybdenum-oxide/>, Retrieved on Feb. 13, 2019, pp. 2.

International Search Report and Written Opinion of the International Searching Authority; PCT/US2022/042707; dated Jan. 11, 2023; 12 pages; European Patent Office.

K.A. Kaliyev, "What Are Tungsten Bronzes", EIR vol. 20, No. 17, Apr. 30, 1993.

Kang et al; "Refractive Index Patterning of Infrared Glass Ceramics Through Laser-Induced Vitrification Invited"; Opticial Materials Express, vol. 8, No. 9, Sep. 1, 2018, pp. 1-12.

Kim et al., "Near Infrared Cut-off Characteristics of various Perovskite-based Composite Films," IPCBEE, 43, 9 (2012).

Klyukin, etal., "Fluorescent clusters in chloride photo-thermo-refractive glass by femtosecond laser bleaching of Ag nanoparticles", Optics Express 12944, 2017, vol. 25, No. 11, pp. 1-8.

Knoema, "Minerals, Ores and Metals » Tungsten APT, European market ($/mtu)", Available Online at <https://knoema.com/UNCTADFMCP2015Feb/free-market-commodity-prices-monthly-update?tsId=1001760>, Aug. 2016, 2 pages.

Kohl, "Amber/Purple Glass—A Molecular Approach", the Flow Magazine, Sep. 2007.

Lee et al., "A Study on Toughened Glass Used for Vehicles and its Testing Methods," http://www-esv.nhtsa.dot.gov/Proceedings/24/files/24ESV-000152.PDF (2015).

Low-e Glass, "Blending Natural Views with Solar Efficiency" Available Online at <https://web.archive.org/web/20150905121620/http://www.ppgideascapes.com/Glass/Products/Low-E-Glass.aspx> Retrieved on Sep. 5, 2015, 2 Pages.

M. Rouhani, "Photochromism of Molybdenum Oxide," National University of Singapore, PHD thesis, NUS Graduate school for Integrative Sciences and Engineering, 2013.

Masterpix (Trademark) Fine Glass Prints; Corning Incorporated; 2019; 3 Pages.

Moon et al., "Near Infrared Shielding Properties of Quarternary Tungsten bronze Nanoparticles Na0.11Cs0.22WO3," Bull. Korean Chem. Soc. 34 [3], 731 (2013).

Motor Trend Network, "Vehicles Offering Panoramic Sunroofs for Less Than $50,000", Available Online <https://web.archive.org/web/20190812165227if_/https://www.motortrend.com/news/vehicles-offering-panoramic-sunroofs-for-less-than-50000> Retrieved on Aug. 12, 2019, 13 page.

Poirier et al., "Redox Behavior of Molybdenum and Tungsten in Phosphate Glasses," J. Phys. Chem. B, 112(15), 4481 (2008).

Rouhani, "Photochromism of Molybdenum Oxide"; National University of Singapore, PhD Thesis, Nus Graduate School for Integrative Sciences and Engineering, 2013.

Saflex, "Rethink color with Saflex interlayers", pp. 4 https://www.saflex.com/pdf/en/sseriesproductbrochure.pdf (2015).

Saflex® SG solar absorbing PVB, Advanced interlayer technology for laminated glass, Available Online at <https://web.archive.org/web/20160807020609/https://www.saflex.com/pdf/en/Al-Arch-009a_Saflex_SG_Solar_A4.pdf> Retrieved on Aug. 7, 2016, 2 pages.

Shi et al., "Hydrothermal Synthesis of CsxWO3 and the Effects of N2 annealing on its Microstructure and Heat Shielding Properties," J. Mater. Sci. Technol., 30 [4], 342 (2014).

Solar Color Series, "VistaGray® and GL-20™" Available Online <https://web.archive.org/web/20151116112852/http://www.pgwglass.com/products/Pages/OEMgVistaGrayGL-20.aspx>Retrieved on Nov. 16, 2013 , 2 pages.

Song et al., "Hydrophilic Molybdenum Oxide Nanomaterials with Controlled Morphology and Strong Plasmonic Absorption for Photothermal Ablation of Cancer Cells," ACS. Appl. Mater. Interfaces, 6(6), 3915-3922 (2014).

Stookey et al; "Full-Color Photosensitive Glass", J. Appl. Phys., 49, 5114-5123 (1978).

Stookey; "Coloration of Glass by Gold, Silver, and Copper"; J. Am. Ceram. Soc., 32[8], 246-249 (1949).

Sunroof—Wikipedia, Available Online <https://en.wikipedia.org/wiki/Sunroof> Jan. 7, 2021, 6 Pages.

Syed et al., "Some properties of sodium tungsten bronzes as a function of sodium concentration," Indian Journal of Chem. Tech., 12, 204 (2005).

Tanaka et al., "Phase Separation of Borosilicate Glass with Molybdenum Oxide Addition and Pore Structure of Porous Glass," J. Ceram. Assoc. Japn, vol. 93 [1083], pp. 700-707 (1985).

The Wayback Machine, "Solar Energy Spectrum", Available Online at <https://web.archive.org/web/20161018054938/http://educationcenter.ppg.com/images/glasstopics/LOW-E%20COATING%201.jpg> Retrieved on Oct. 18, 2016, 1 Page.

V. P. Vieko, Q. K. Kieu, N. V. Nikonorov, znd P. A. Skiba, "On the Reversibility of Laser-induced Phase-structure Modification of Glass-ceramics". JLMN-Journal of Laser Micro/Nanoengineering vol. 1, No. 2, 2006.

Veiko et al; "Physical Mechanisms of Fast Structure Modification and the Appearance of Waves of Optical Bleaching in Glass Ceramics"; Laser Physics, 2008, vol. 18, No. 4, pp. 363-373.

Veiko et al; "Waves of Optical Bleaching Caused by Continuously Operated YAG Laser Radiation in Glass-Ceramics"; Proceedings of SPIE; vol. 6985, 2008, pp. 1-9.

* cited by examiner

200

204

IRRADIATING A GLASS-CERAMIC ARTICLE WITH A BEAM OF A LASER

208

ALTERING A PHYSICAL PROPERTY OF THE GLASS-CERAMIC ARTICLE

212

BLEACHING THE GLASS-CERAMIC ARTICLE

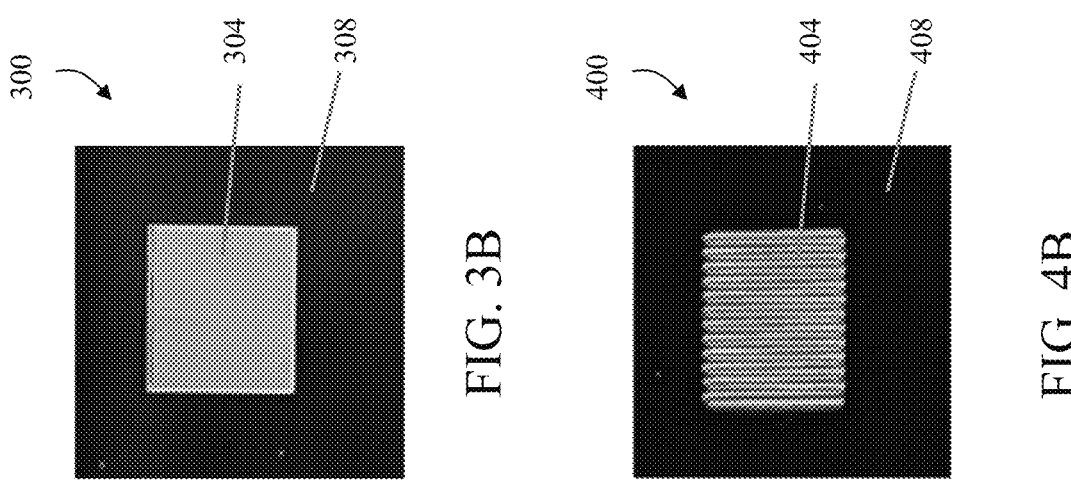
FIG. 3A
FIG. 3B
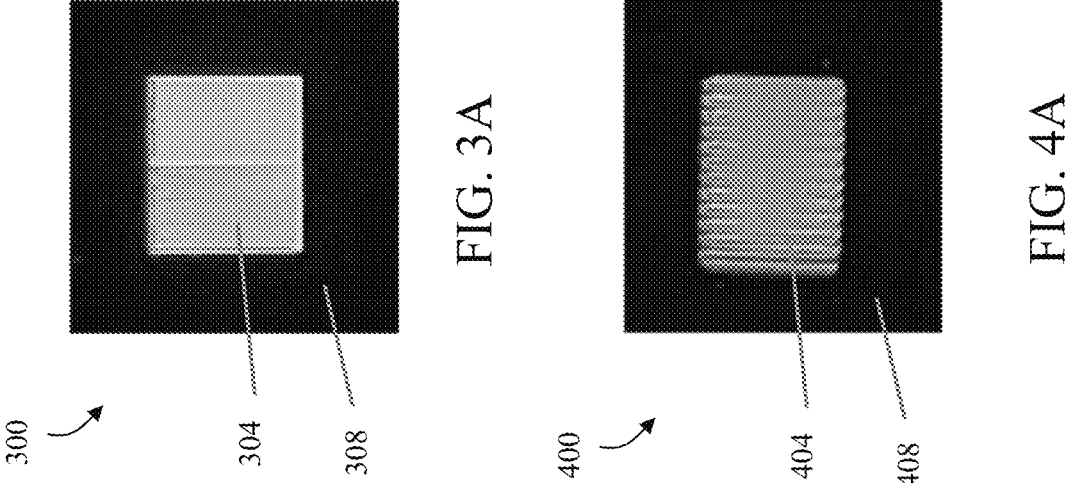
FIG. 4A
FIG. 4B

500

504

508

500

504

508

500

504

508

GLASS-CERAMIC ARTICLES WITH HIGH DYNAMIC RANGE TRANSMITTANCE VIA LASER BLEACHING

CROSS-REFERENCE TO RELATED APPLICATIONS

This application claims the benefit of priority under 35 U.S.C. § 119 of U.S. Provisional Application No. 63/243,199, filed Sep. 12, 2021, the content of which is incorporated herein by reference in its entirety.

FIELD

The present disclosure relates generally to glass ceramics. More specifically, the present disclosure relates to bleaching of glass ceramics using laser radiation.

BACKGROUND

Some products require highly-transparent apertures to be optically separated or isolated from one another, for example, by an opaque material that is intermediate the apertures. In existing configurations, such optical separation can be achieved by precision machining both an opaque material and separate portions of a highly-transparent material that is different than the opaque material and then setting the highly-transparent material portions in the opaque material. However, the precision machining and setting of different materials to provide such optical separation can be complex and expensive. Accordingly, there is a need for a monolithic glass ceramic material configured to be bleached to provide one or more highly-transparent apertures in a bleached region of the material and high optical absorbance in an unbleached region of the material so as to optically isolate the aperture(s). It would be further advantageous to provide such optical separation within a predetermined range of wavelengths.

SUMMARY

A first aspect of the present includes an article, comprising: a glass ceramic having an amorphous silicate glass phase and a crystalline phase including a species of $M_xWO_3$ with $0<x<1$ and M an intercalated dopant cation, wherein the glass ceramic with the species of $M_xWO_3$ has a transmittance of less than 0.01%/mm at first wavelengths from 500 nm to 1100 nm; and an aperture in the glass ceramic having a transmittance of at least 70%/mm at the first wavelengths, wherein the aperture comprises constituents of the silicate glass phase and the crystalline phase but is substantially free of the species of $M_xWO_3$ such that if the article is heated to 400° C. for 1 hour the aperture has a retained transmittance of at least 50%/mm at the first wavelengths.

A second aspect of the present disclosure includes an article according to the first aspect, wherein the glass ceramic comprises: $SiO_2$ from about 55 mol % to about 75 mol %, $Al_2O_3$ from about 3 mol % to about 15 mol %, $B_2O_3$ from about 5 mol % to about 15 mol %, $R_2O$ from about 1 mol % to about 13 mol %, wherein $R_2O$ is one or more of $Li_2O$, $Na_2O$, $K_2O$, $Rb_2O$, $Cs_2O$, CaO from about 0 mol % to about 0.5 mol %, $SnO_2$ from about 0.01 mol % to about 1.5 mol %, $WO_3$ from about 1 mol % to about 10 mol %, and $MoO_3$ from about 0 mol % to about 3 mol %, wherein a difference in the amount of the $R_2O$ and the $Al_2O_3$ ranges from about −1 mol % to about 1 mol %.

A third aspect of the present disclosure includes an article according to the first aspect, wherein the glass ceramic comprises: $SiO_2$ from about 57 mol % to about 74 mol %, $Al_2O_3$ from about 4 mol % to about 14 mol %, $B_2O_3$ from about 7 mol % to about 12 mol %, $R_2O$ from about 2 mol % to about 12 mol %, wherein $R_2O$ is one or more of $Li_2O$, $Na_2O$, $K_2O$, $Rb_2O$, $Cs_2O$, CaO from about 0.01 mol % to about 0.4 mol %, $SnO_2$ from about 0.025 mol % to about 0.75 mol %, $WO_3$ from about 3.25 mol % to about 9 mol %, and $MoO_3$ from about 0.05 mol % to about 2.5 mol %, wherein a difference in the amount of the $R_2O$ and the $Al_2O_3$ ranges from about −0.75 mol % to about 0.75 mol %.

A fourth aspect of the present disclosure includes an article according to the first aspect, wherein the glass ceramic comprises: $SiO_2$ from about 60 mol % to about 72 mol %, $Al_2O_3$ from about 5 mol % to about 12 mol %, $B_2O_3$ from about 8 mol % to about 11 mol %, $R_2O$ from about 3 mol % to about 11 mol %, wherein $R_2O$ is one or more of $Li_2O$, $Na_2O$, $K_2O$, $Rb_2O$, $Cs_2O$, CaO from about 0.05 mol % to about 0.2 mol %, $SnO_2$ from about 0.1 mol % to about 0.35 mol %, $WO_3$ from about 3.3 mol % to about 8 mol %, and $MoO_3$ from about 0.1 mol % to about 0.5 mol %, wherein a difference in the amount of the $R_2O$ and the $Al_2O_3$ ranges from about −0.5 mol % to about 0.1 mol %.

A fifth aspect of the present disclosure includes an article according to any of the first through fourth aspects, wherein the aperture has a transmittance of at least 80%/mm and a retained transmittance of at least 70%/mm at the first wavelengths.

A sixth aspect of the present disclosure includes an article according to any of the first through fourth aspects, wherein the aperture has a transmittance of at least 85%/mm and a retained transmittance of at least 80%/mm at the first wavelengths.

A seventh aspect of the present disclosure includes an article according to the sixth aspect, wherein the aperture has a retained transmittance of at least 85%/mm at the first wavelengths.

An eighth aspect of the present disclosure includes an article according to any one of the first through seventh aspects, wherein the glass ceramic has a transmittance of less than 0.005%/mm at the first wavelengths.

A ninth aspect of the present disclosure includes an article according to any one of the first through seventh aspects, wherein the glass ceramic has a transmittance of less than 0.001%/mm at the first wavelengths.

A tenth aspect of the present disclosure includes an article according to any one of the first through ninth aspects, wherein the aperture has the transmittance and the retained transmittance at second wavelengths from 450 nm to 1750 nm.

An eleventh aspect of the present disclosure includes an article according to any one of the first through ninth aspects, wherein the aperture has the transmittance and the retained transmittance at third wavelengths from 425 nm to 2400 nm.

A twelfth aspect of the present disclosure includes an article according to the tenth aspect, wherein the glass ceramic has the transmittance at the second wavelengths.

A thirteenth aspect of the present disclosure includes an article according to the eleventh aspect, wherein the glass ceramic has the transmittance at the third wavelengths.

A fourteenth aspect of the present disclosure includes an article according to any one of the first through thirteenth aspects, wherein the glass ceramic is substantially free of iron.

A fifteenth aspect of the present disclosure includes an article according to any one of the first through fourteenth aspects, wherein the aperture extends parallel with the thickness.

A sixteenth aspect of the present disclosure includes an article according to any one of the first through fourteenth aspects, wherein the aperture extends transversely relative to the thickness.

A seventeenth aspect of the present disclosure includes an article according to any one of the first through fourteenth aspects, wherein the aperture is oriented at an angle between 1° and 85° relative to the thickness.

An eighteenth aspect of the present disclosure includes an article according to any one of the first through seventeenth aspects, wherein the aperture comprises a plurality of apertures having a minimum spacing therebetween.

A nineteenth aspect of the present disclosure includes an article according to the eighteenth aspect, wherein the minimum spacing is at least 0.5 mm.

A twentieth aspect of the present includes a method of bleaching a glass-ceramic article, comprising: irradiating a glass-ceramic article with a beam from a laser, the glass-ceramic article comprising a bulk having an amorphous silicate glass phase and a crystalline phase, the irradiating a glass-ceramic article comprising directing the beam of the laser into a thickness of the glass-ceramic article to form an aperture in the bulk, the beam comprising a wavelength configured to couple into respective absorption bands of the crystalline phase and/or of other constituents of the bulk, wherein a ratio between a transmittance of the aperture and a transmittance of the bulk is at least 7,000 at first wavelengths from 500 nm to 1100 nm.

A twenty first aspect of the present disclosure includes a method according to the twentieth aspect, wherein the wavelength of the beam of the laser is within a range in which an absorbance of the bulk at a distance of 1 mm and at the first wavelengths is greater than 4 and less than 10.

A twenty second aspect of the present disclosure includes a method according to the twentieth aspect, wherein the wavelength of the beam of the laser is within a range of 2 μm and 3 μm.

A twenty third aspect of the present disclosure includes a method according to the twentieth aspect, wherein the wavelength of the beam of the laser is within a range of 2.6 μm and 2.75 μm.

A twenty fourth aspect of the present disclosure includes a method according to the twentieth aspect, wherein the wavelength of the beam of the laser is within a range of 2.68 μm and 2.72 μm.

A twenty fifth aspect of the present disclosure includes a method according to any one of the twentieth through twenty fourth aspects, wherein the transmittance of the aperture is at least 70%/mm at the first wavelengths.

A twenty sixth aspect of the present disclosure includes a method according to any one of the twentieth through twenty fourth aspects, wherein the transmittance of the aperture is at least 80%/mm at the first wavelengths.

A twenty seventh aspect of the present disclosure includes a method according to any one of the twentieth through twenty fourth aspects, wherein the transmittance of the aperture is at least 85%/mm at the first wavelengths.

A twenty eighth aspect of the present disclosure includes a method according to any one of the twentieth through twenty seventh aspects, wherein the transmittance of the bulk is less than 0.01%/mm at the first wavelengths.

A twenty ninth aspect of the present disclosure includes a method according to any one of the twentieth through twenty seventh aspects, wherein the transmittance of the bulk is less than 0.005%/mm at the first wavelengths.

A thirtieth aspect of the present disclosure includes a method according to any one of the twentieth through twenty seventh aspects, wherein the transmittance of the bulk is less than 0.001%/mm at the first wavelengths.

A thirty first aspect of the present disclosure includes a method according to any one of the twentieth through thirtieth aspects, wherein the transparent bleached region has a resolution of about 20 μm in a direction perpendicular to the thickness.

A thirty second aspect of the present disclosure includes a method according to any one of the twentieth through thirtieth aspects, wherein the transparent bleached region has a resolution of about 10 μm in a direction perpendicular to the thickness.

A thirty third aspect of the present disclosure includes a method according to the thirty first aspect or the thirty second aspect, wherein the transparent bleached region has the resolution along an entirety of the thickness.

A thirty fourth aspect of the present disclosure includes a method according to any one of the twentieth through thirty third aspects, wherein the crystalline phase comprises a species of $M_xWO_3$ where $0<x<1$ and where M is an intercalated dopant cation, the wavelength of the beam of the laser coupling to the absorption band of the species of $M_xWO_3$ during the irradiating.

A thirty fifth aspect of the present disclosure includes a method according to any one of the twentieth through thirty third aspects, wherein the other constituents of the bulk comprise chemical hydroxyl groups, and wherein the wavelength of the beam is configured to couple into an absorption band of the chemical hydroxyl groups in the bulk.

A thirty sixth aspect of the present disclosure includes a method according to any one of the twentieth through thirty fifth aspects, wherein the directing the beam of the laser comprises directing a focused, moving beam within the thickness of the glass-ceramic article to form the aperture in the bulk.

A thirty seventh aspect of the present disclosure includes a method according to any one of the twentieth through thirty fifth aspects, wherein the directing the beam of the laser comprises directing a defocused, static beam through the thickness of the glass-ceramic article to form the aperture in the bulk.

A thirty eighth aspect of the present disclosure includes a method according to any one of the twentieth through thirty seventh aspects, further comprising heat treating the glass-ceramic article to 400° C. for 1 hour after the irradiating, the aperture having a retained transmittance of at least 50%/mm at the first wavelengths after the heating treating.

A thirty ninth aspect of the present disclosure includes a method according to the thirty eighth aspect, wherein the aperture has a transmittance of at least 80%/mm and a retained transmittance of at least 70%/mm at the first wavelengths.

A fortieth aspect of the present disclosure includes a method according to the thirty eighth aspect, wherein the aperture has a transmittance of at least 85%/mm and a retained transmittance of at least 80%/mm at the first wavelengths.

A forty first aspect of the present disclosure includes a method according to the thirty eighth aspect, wherein the aperture has a retained transmittance of at least 85%/mm at the first wavelengths.

A forty second aspect of the present disclosure includes a method according to any one of the thirty eighth through forty first aspects, wherein the transmittance of the bulk is less than 0.01%/mm at the first wavelengths.

A forty third aspect of the present disclosure includes a method according to any one of the thirty eighth through forty first aspects, wherein the transmittance of the bulk is less than 0.005%/mm at the first wavelengths.

A forty fourth aspect of the present disclosure includes a method according to any one of the thirty eighth through forty first aspects, wherein the transmittance of the bulk is less than 0.001%/mm at the first wavelengths.

A forty fifth aspect of the present disclosure includes a method according to any one of the twentieth through thirty seventh aspects, further comprising ion exchanging the glass ceramic in a bath comprising sodium nitrate and/or potassium nitrate between a temperature of 360 and 450° C. for between 0.25 and 25 hours, the aperture having a retained transmittance of at least 50%/mm at the first wavelengths after the ion exchanging.

A forty sixth aspect of the present disclosure includes a monolithic article comprising one or more bleached portions having a transmittance greater than 85%/mm at wavelengths between 500 and 1000 nm and an unbleached portion having a transmittance less than 0.01%/mm at wavelengths between 500 and 1000 nm.

A forty seventh aspect of the present disclosure includes a monolithic article comprising one or more bleached portions having an optical density less than 0.07/mm at wavelengths between 500 and 1000 nm and an unbleached portion having an optical density greater than 4/mm at wavelengths between 500 and 1000 nm.

A forty eighth aspect of the present disclosure includes an article comprising a glass ceramic having an amorphous silicate glass phase and a crystalline phase including a species of $M_xWO_3$ with $0<x<1$ and M an intercalated dopant cation, an aperture configured to be formed via local heating of a portion of the glass ceramic to a temperature that is above the softening point of the glass ceramic, the aperture comprising constituents of the silicate glass phase and the crystalline phase but is substantially free of the species of $MxWO_3$, wherein a ratio of a transmittance of the aperture to a transmittance of the glass ceramic not subject to the local heating is at least 6,000 with transmittance measured in %/mm at wavelengths from 500 nm to 1100 nm.

A forty ninth aspect of the present disclosure includes an article according to the forty eighth aspect or the forty ninth aspect, wherein the transmittance of the aperture is at least 70%/mm.

A fiftieth aspect of the present disclosure includes an article according to the forty eighth aspect or the forty ninth aspect, wherein the transmittance of the glass ceramic not subject to the local heating is less than or equal to 0.01%/mm.

A fifty first aspect of the present disclosure includes an article according to any one of the forty eighth through fiftieth aspects, wherein the local heating is via laser irradiation.

A fifty second aspect of the present disclosure includes an article according to any one of the forty eighth through fifty first aspects, wherein the glass ceramic comprises $WO_3$ from about 1 mol % to about 10 mol %.

A fifty third aspect of the present disclosure includes an article according to the forty eighth through fifty third aspects, wherein the temperature is above the liquidus temperature of the crystalline phase of the glass ceramic.

A fifty fourth aspect of the present disclosure includes an article according to the forty eighth through fifty third aspects, wherein the temperature is at least 1000° C.

A fifty fifth aspect of the present disclosure includes an article according to the forty eighth through fifty fourth aspects, wherein the glass ceramic has opposed surfaces separated by a thickness, the aperture extending at least partially through the thickness.

A fifty sixth aspect of the present disclosure includes an article according to the fifty fifth aspect, wherein the aperture extends entirely through the thickness and adjoins the opposed surfaces.

A fifty seventh aspect of the present disclosure includes an article according to the fifty fifth aspect or the fifty sixth aspect, wherein the aperture extends through the thickness in a direction forming a nonzero angle relative to at least one of the opposed surfaces.

A fifty eighth aspect of the present disclosure includes an article according to the fifty fifth through fifty seventh aspects, wherein the aperture comprises a plurality of apertures.

A fifty ninth aspect of the present disclosure includes an article according to the fifty eighth aspect, wherein the apertures are positioned linearly in a direction parallel to at least one of the opposed surfaces.

A sixtieth aspect of the present disclosure includes an article according to the fifty eighth aspect, wherein the apertures are positioned rotationally about an axis perpendicular to at least one of the opposed surfaces.

A sixty first aspect of the present disclosure includes an article according to the fifty eighth through sixtieth aspects, wherein the apertures extend through the thickness in parallel relative to one another.

A sixty second aspect of the present disclosure includes an article according to the fifty eighth through sixtieth aspects, wherein the apertures extend through the thickness transversely relative to one another.

A sixty third aspect of the present disclosure includes an article according to the fifty eighth through sixty second aspects, wherein each aperture has a cross section that is curvilinear.

A sixty fourth aspect of the present disclosure includes an article according to the sixty third aspect, wherein the cross section of each aperture is cylindrical.

A sixty fifth aspect of the present disclosure includes an article according to the fifty eighth through sixty second aspects, wherein each aperture has a cross section that is polygonal.

A sixty sixth aspect of the present disclosure includes an article according to the sixty fifth aspect, wherein the cross section of each aperture is rectangular.

A sixty seventh aspect of the present disclosure includes an article according to the sixty third through sixty sixth aspects, wherein the cross section of each aperture has a high aspect ratio so as to form a plurality of slits in the glass ceramic.

A sixty eighth aspect of the present disclosure includes an article according to the fifty eighth through sixty seventh aspects, wherein at least some of the apertures abut one another.

A sixty ninth aspect of the present disclosure includes an article according to the fifty eighth through sixty seventh aspects, wherein at least some of the apertures overlap one another.

A seventieth aspect of the present disclosure includes an article according to the fifty eighth through sixty seventh aspects, wherein the apertures are spaced from one another by an aperture spacing.

A seventy first aspect of the present disclosure includes an article according to the seventieth aspect, wherein the minimum spacing is at least 0.1 mm.

A seventy second aspect of the present disclosure includes an article according to the seventieth aspect, wherein the aperture spacing is in a range of from about 0.01 mm to about 0.19 mm.

A seventy third aspect of the present disclosure includes an article according to the fifty eighth through seventy second aspects, wherein each aperture has a diameter in a range of from about 0.01 mm to about 5 mm.

A seventy fourth aspect of the present disclosure includes an article according to the seventy third aspect, wherein the diameter is in a range of from about 0.5 mm to about 3 mm.

A seventy fifth aspect of the present disclosure includes an article according to the fifty fifth through seventy fourth aspects, wherein the thickness of the glass ceramic is in a range of from about 0.1 mm to about 5 mm.

A seventy sixth aspect of the present disclosure includes an article comprising a glass ceramic having an amorphous silicate glass phase and a crystalline phase including a species of $M_xWO_3$ with $0<x<1$ and M an intercalated dopant cation, wherein the glass ceramic with the species of $M_xWO_3$ has a transmittance of less than 0.01%/mm at first wavelengths from 500 nm to 1100 nm; and an aperture in the glass ceramic having a transmittance of at least 70%/mm at the first wavelengths, the aperture comprising constituents of the silicate glass phase and the crystalline phase but is substantially free of the species of $M_xWO_3$, wherein the glass ceramic comprises: $SiO_2$ from about 55 mol % to about 75 mol %, $Al_2O_3$ from about 3 mol % to about 15 mol %, $B_2O_3$ from about 5 mol % to about 15 mol %, $R_2O$ from about 1 mol % to about 13 mol %, wherein $R_2O$ is one or more of $Li_2O$, $Na_2O$, $K_2O$, $Rb_2O$, $Cs_2O$, CaO from about 0 mol % to about 0.5 mol %, $SnO_2$ from about 0.01 mol % to about 1.5 mol %, $WO_3$ from about 1 mol % to about 10 mol %, and $MoO_3$ from about 0 mol % to about 3 mol %, wherein a difference in the amount of the $R_2O$ and the $Al_2O_3$ ranges from about −1 mol % to about 1 mol %.

A seventy seventh aspect of the present disclosure includes an article according to the seventy sixth aspect, wherein the aperture has a retained transmittance of at least 50%/mm at the first wavelengths after a heat treatment.

A seventy eighth aspect of the present disclosure includes an article according to the seventy seventh aspect, wherein the heat treatment comprises heating the article to 400° C. for 1 hour.

A seventy ninth aspect of the present disclosure includes an article according to the seventy sixth through seventy eighth aspects, wherein the aperture comprises a plurality of apertures with each aperture having a diameter in a range of from about 10 μm to about 5,000 μm.

An eightieth aspect of the present disclosure includes an article according to the seventy ninth aspect, wherein adjacent apertures of the plurality of apertures have a center-to-center spacing in a range of from about 20 μm to about 200 μm.

BRIEF DESCRIPTION OF THE DRAWINGS

FIG. 3A is a photograph of an article that was laser bleached with a focused, moving beam using a mid-IR wavelength according to the principles of the disclosure, the article comprising a transparent aperture bleached into an opaque bulk formed from the glass composition of Sample 54;

FIG. 3B is a photograph of the article of FIG. 3A after a heat treatment;

FIG. 4A is a photograph of an article that was laser bleached with a focused, moving beam using a mid-IR wavelength according to the principles of the disclosure, the article comprising a transparent aperture bleached into an opaque bulk formed from the glass composition of Sample 56;

FIG. 4B is a photograph of the article of FIG. 4A after a heat treatment;

DETAILED DESCRIPTION

Figure 1:
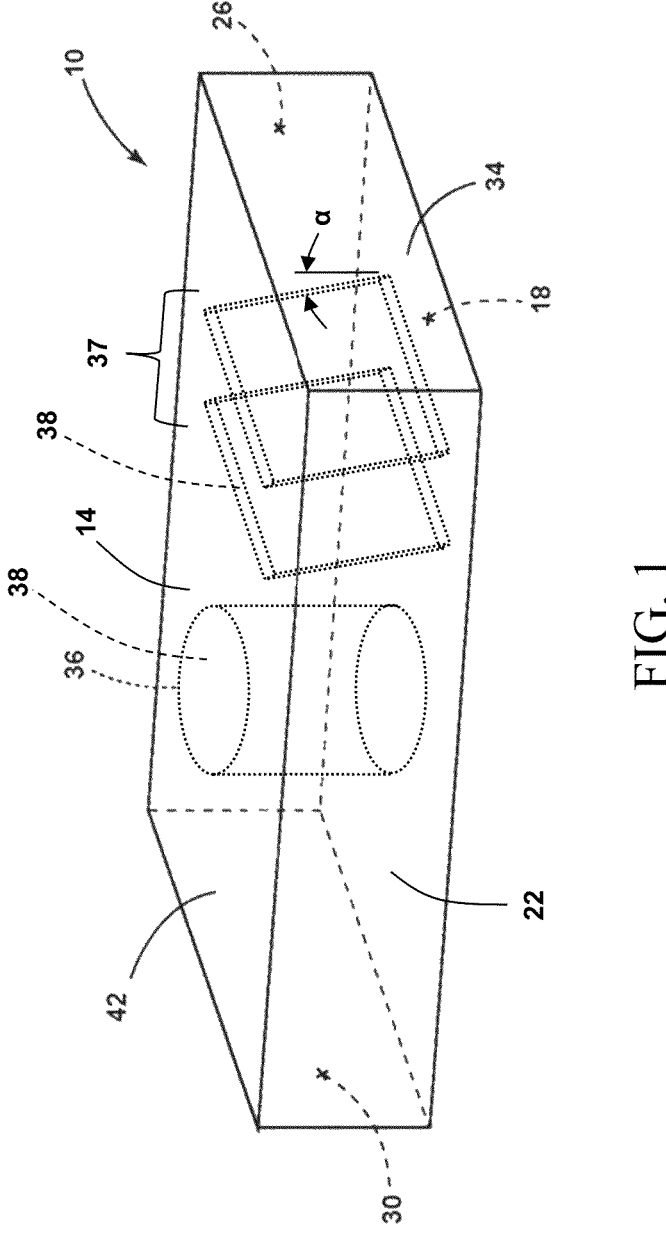
FIG. 1 is a front perspective view of an article with at least one transparent region bleached into an opaque bulk of the article, according to one example.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein, unless defined elsewhere in association with specific terms or phrases, are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

Directional terms as used herein—for example up, down, right, left, front, back, top, bottom, above, below, and the like—are made only with reference to the figures as drawn and are not intended to imply absolute orientation.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

For purposes of this disclosure, the terms "bulk," "bulk composition," and/or "overall compositions" are intended to include the overall composition of the entire article. These terms may be differentiated from a "local composition" or "localized composition," which refers to a composition at a particular location, over a particular area, or over a particular volume on or within the article. The local composition may differ from the bulk composition owing, for example, to the formation of crystalline and/or ceramic phases.

As used herein, the terms "article," "glass-article," "ceramic-article," "glass-ceramics," "glass elements," "glass-ceramic article," and "glass-ceramic articles" may be used interchangeably, and in their broadest sense, to include any object made wholly or partly of glass and/or glass-ceramic material having a crystalline phase.

As used herein, a "glass" or "glass state" refers to an inorganic amorphous phase material within the articles of the disclosure that is a product of melt fusion that has cooled to a rigid condition without crystallizing. As used herein, a "glass-ceramic" or "glass-ceramic state" refers to an inorganic material within the articles of the disclosure which includes both the glass state and a crystalline phase and/or crystalline precipitates as described herein.

As used herein, "a crystalline phase" and/or "crystalline precipitates" refers to an inorganic material within the articles of the disclosure that is a solid composed of atoms, ions, or molecules arranged in a pattern that is periodic in three dimensions. Further, "a crystalline phase" as referenced in this disclosure, unless expressly noted otherwise, is determined to be present using the following method. First, powder x-ray diffraction ("XRD") is employed to detect the presence of crystalline precipitates. Second, Raman spectroscopy ("Raman") is employed to detect the presence of crystalline precipitates in the event that XRD is unsuccessful (e.g., due to size, quantity and/or chemistry of the precipitates). Optionally, transmission electron microscopy ("TEM") is employed to visually confirm or otherwise substantiate the determination of crystalline precipitates obtained through the XRD and/or Raman techniques. In certain circumstances, the quantity and/or size of the precipitates may be low enough that visual confirmation of the precipitates proves particularly difficult. As such, the larger sample size of XRD and Raman may be advantageous in sampling a greater quantity of material to determine the presence of the precipitates.

As used herein, "transmission", "transmittance", "optical transmittance," and "total transmittance" are used interchangeably in the disclosure and refer to external transmission or transmittance, which takes absorption, scattering, and reflection into consideration. Fresnel reflection is not subtracted out of the transmission and transmittance values reported herein. The measures of transmittance in this disclosure are not normalized. As such, the measures of transmittance are reported with the thickness of the sample in millimeters. In addition, any total transmittance values referenced over a particular wavelength range are given as an average of the total transmittance values measured over the specified wavelength range. Transmittance (T) is defined as the ratio of the transmitted intensity (I) over the incident intensity (I0) and is given by the equation $T=I/I0$. Transmittance takes values between 0 and 1 though it is often expressed as a percentage out of one-hundred. Transmittance is measured with a spectrometer.

As used herein, "optical density units", "OD" and "OD units" are used interchangeably in the disclosure to refer to optical density units, as commonly understood as a measure of "absorbance" of the material tested, as measured with a spectrometer. The measures of absorbance in this disclosure are not normalized. As such, the measures of absorbance are reported with the thickness of the sample in millimeters. In addition, any absorbance referenced over a particular wavelength range (e.g., UV wavelengths from 280 nm to 380 nm) are given as an average value of the absorbance over the specified wavelength range. Absorbance (A) is related to the transmittance, transmitted intensity, and incident intensity by the equation A=log 10*I0/I=−log 10*T. For example, an absorbance of 0 corresponds to a transmittance of 100% whereas an absorbance of 1 corresponds to 10% transmittance. Unless otherwise specified, transmittance and absorbance are measured using the PerkinElmer Lambda 950 UV-Vis-NIR Spectrophotometer, which is a commercially available spectrometer.

The present disclosure relates generally to articles that have one or more highly transparent regions (bleached into) or formed within a monolithic material that is highly opaque at visible and near infrared (NIR) wavelengths and methods of forming such regions. Specifically, the high opacity in this disclosure is achieved with high absorption which is superior to opaque scattering materials. The transparent regions in embodiments can include one or more apertures, louvers, or any similarly highly transparent optical path or passage configured to permit light to be transmitted through the highly opaque material at a high transmittance. One of skill in the art will recognize that the transparent regions applied to the article may take many forms without departing from the concepts disclosed herein. The highly opaque monolithic material in embodiments is configured to optically isolate the one or more transparent regions with a high absorbance at a minimum path length.

In various examples of the present disclosure, an article that is bleached can be a glass-ceramic article. The article that is bleached can be a tungsten, molybdenum, titanium, and/or magnesium containing glass ceramic, such as those disclosed in U.S. Pat. No. 10,246,371 entitled ARTICLES INCLUDING GLASS AND/OR GLASS-CERAMICS AND METHODS OF MAKING THE SAME, U.S. Pat. No. 10,370,291 entitled ARTICLES INCLUDING GLASS AND/OR GLASS-CERAMICS AND METHODS OF MAKING THE SAME, U.S. Pat. No. 10,450,220 entitled GLASS-CERAMICS AND GLASSES, U.S. Patent Application Publication No. 2019/0177206 (Ser. No. 16/190,712) entitled POLYCHROMATIC ARTICLES AND METHODS OF MAKING THE SAME, International Application Publication No. WO 2019/051408 entitled DEVICES WITH BLEACHED DISCRETE REGION AND METHODS OF MANUFACTURE, and U.S. patent application Ser. No. 17/183,539, filed Feb. 24, 2021 and entitled LOW TEMPERATURE LASER BLEACHING OF POLYCHROMATIC GLASS CERAMICS, the content of each of which is incorporated herein by reference in its entirety.

In general, the crystalline phases formed by heat treating the compositions of the articles (prior to bleaching) described herein may be referred to as sub-oxides. Tungsten bronzes are examples of sub-oxides in that such crystals have a non-stoichiometric ratio of dopants to tungsten ions. Crystalline structures that are present in the glass-ceramic articles of the present disclosure are capable of undergoing changes in oxidation state and changes in dopant concentration as a result of one or more heating processes applied during manufacture to effect various colors and/or color profiles for the glass-ceramic article. Similarly, the oxidation state and/or the dopant concentration of the crystalline structures of the present disclosure may be altered by the bleaching processes disclosed herein. The changes in dopant concentration also effects absorbance of the compositions in the ultraviolet (UV), visible, and near infrared (NIR) wavelength regimes. In various examples, changes in the crystal structure, changes in stoichiometry, and/or changes in oxidation state induced by the beam from the laser may be accompanied by re-solubilization of the crystals such that the crystals are dissolved into the glass matrix. The traits of the crystalline structure of the glass-ceramic article have allowed the glass-ceramic articles of the present disclosure to bleach at relatively low temperatures.

The composition of the glass-ceramic article can be designed for a particular forming process (e.g., fusion forming, pressing, casting, etc.) and the glass-ceramic article can be subsequently processed with heat treatment(s) to adjust or tune a color and/or a saturation level or absorbance of the glass-ceramic article to a desired color and/or saturation level. Regardless of the approach or method utilized in the formation of the glass-ceramic article, the glass-ceramic article can be bleached by the techniques disclosed herein. The glass transition temperature, Tg, of the glass-ceramic articles bleached by the process of the present disclosure differ from one another. However, the glass transition temperatures of each of the various compositions are in the range of about 400° C. to about 600° C.

"Glass transition temperature" is defined herein as the temperature at which a glass, or glass portion of a glass ceramic, has a viscosity of 1012 Poise. "Annealing point" or "annealing temperature" is defined herein as the temperature at which a glass, or glass portion of a glass ceramic, has a viscosity of 1013 Poise. "Softening point" or "softening temperature" is defined herein as the temperature at which a glass, or glass portion of a glass ceramic, has a viscosity of 107.6 Poise. When cooling of the article is uniform, the glass transition temperature or annealing temperature may be approximately the same throughout the article. However, in the event that cooling in one portion of the article differed from the cooling in another portion of the article, then the glass transition temperature or the annealing temperature may be different in the portions with differing cooling rates or cooling histories. Local fluctuations in glass composition can also lead to slight variations in glass transition temperature or annealing temperature.

The desired color and/or saturation level or absorbance of the glass-ceramic article can have an impact on a final contrast ratio bleached region formed in the glass-ceramic article. The methods disclosed herein are capable of bleaching the glass-ceramic article such that the region that is bleached is transparent or substantially transparent in a given wavelength range (e.g., one or more wavelengths of the visible spectrum from about 380 nm to 740 nm). Accordingly, glass-ceramic articles that are produced with a greater saturation level may exhibit a greater resulting contrast ratio than glass-ceramic articles that are produced with a lower saturation level. While a selective application of one or more heating processes can be utilized to adjust the color and/or saturation level of the glass-ceramic article during manufacture, the local heating process disclosed herein (e.g., laser bleaching) that is used for bleaching the article may reverse the one or more heating processes to remove the color and/or decrease the saturation level in the regions that are bleached. Accordingly, the color or other property of the article may be altered in a region that has been bleached. Examples of physical and chemical properties that are altered by interaction with the beam from the laser can include, but are not limited to, oxidation state, coordination number, structural phase, mechanical properties (e.g., local density and/or local stress), crystallinity, percent crystallinity, and/or thermal properties (e.g., Tg, fictive temperature, and/or specific heat).

With reference to FIG. 1, a glass-ceramic article 10 is depicted. The article 10 has a thickness, a width, and a length. The thickness extends between a top surface 14 and a bottom surface 18 of the article 10. The width extends between a front surface 22 and a rear surface 26 of the article 10. The length extends between side surfaces 30, 34 of the article 10. In embodiments, the article 10 has a thickness that ranges from 0.05 mm to about 5 mm, from about 0.05 mm to about 4 mm, from about 0.05 mm to about 3 mm, from about 0.05 mm to about 2 mm, from about 0.05 mm to about 1 mm, from about 0.05 mm to about 0.5 mm, from about 0.05 mm to about 0.25 mm, from about 0.05 mm to about 0.2 mm, from about 0.1 mm to about 5 mm, from about 0.1 mm to about 4 mm, from about 0.1 mm to about 3 mm, from about 0.1 mm to about 2 mm, from about 0.1 mm to about 1 mm, from about 0.1 mm to about 0.5 mm, from about 0.1 mm to about 0.25 mm, and all thickness values between these thickness range endpoints. Further, the article 10 can have a selected length and width, or diameter, to define its surface area. The article 10 can have at least one edge between the surfaces 14, 18 of the substrate 10 defined by its length and width, or diameter.

A first bleached region 36 is illustrated in phantom lines in exemplary form and is shown as a cylindrical aperture. The first bleached region 36 can extend through an entirety of the thickness in a direction parallel to the thickness. The first bleached region 36 can have a resolution that is the same or substantially the same through the entirety of the extent to which the first bleached region 36 extends through the thickness. That is, a resolution of the first bleached region 36 can be the same or substantially same at a portion of the first bleached region 36 that is proximate to the top surface 14, at a portion of the first bleached region 36 that is proximate to the bottom surface 18, and at a portion of the first bleached region 36 that is positioned intermediate the top surface 14 and the bottom surface 18.

A second bleached region 37 is illustrated in phantom lines in exemplary form and is shown as a pair of slits or louvers in the article 10. The second bleached region 37 can extend through an entirety of the thickness. Similar to the first bleached region 36, the second bleached region 37 can have a resolution that is the same or substantially the same through the entirety of the extent to which the second bleached region 37 extends through the thickness. The second bleached region 37 in embodiments can be oriented at an angle $\alpha$ relative to the surfaces between which it extends as shown in FIG. 1. The angle $\alpha$ in embodiments can be between 1° and 85° relative to the direction of the thickness. In embodiments, the article 10 can include the first bleached region 36, the second bleached region 37, or both the first bleached region 36 and the second bleached region 37. The article 10 in embodiments can include any number of additional bleached regions. The first bleached region 36, the second bleached region, and any additional bleached regions can have any number, geometry, and/or orientation desired.

The first bleached region 36, the second bleached region 37, and/or any number of additional bleached regions can define one or more apertures in or through the article 10. As used herein, "aperture" refers to an integral portion of the article through which light travels with a substantially higher transmittance than through unbleached regions of the article 10. In embodiments, an aperture can be round, elliptical, or any suitable polygonal geometric shape, such as rectangular, square, or triangular. In some embodiments in which the aperture is formed through the thickness of a material defined by a first surface and a second surface, as described above, the aperture can have a cross-sectional dimension that is the same through the thickness of the material or different through the thickness of the material. As a non-limiting example, for an aperture that is circular in cross-section, the aperture can be cylindrical and have the same cross-sectional diameter at the first surface and second surface of the material. In embodiments, the aperture cross-sectional dimension is larger at the first surface of the material than at the second surface of the material. For example, the aperture can be conical in shape. The term "diameter" is not limited to a circular shape in embodiments disclosed herein. Thus, "diameter" in embodiments can refer to a distance between edges of an aperture which can be square, rectangular, polygonal, or any suitable geometric shape for a particular end use. For apertures that are polygonal, the diameter refers to a straight line passing from side to side through the center of the aperture. In the case of a rectangle, the diameter refers to the smallest cross-sectional dimension of the rectangle. In the case of a triangle, diameter refers to the smallest height of the triangle. In the case of an elliptical aperture, the diameter refers to the smallest cross-sectional dimension passing through the center of the ellipse.

The bleached regions in embodiments comprise a plurality of apertures with each aperture having a diameter in a range of from about 10 µm to about 100,000 µm, or from about 10 µm to about 10,000 µm, or from about 10 µm to about 5,000 µm, or from about 10 µm to about 1,000 µm, or from about 10 µm to about 500 µm, or in a range from about 25 µm to about 1,000 µm, or from about 50 µm to about 10,000 µm, or from about 50 µm to about 5,000 µm or from about 50 µm to about 1,000 µm, or from about 50 µm to about 500 µm, or from about 50 µm to about 300 µm, or from about 50 µm to about 200 µm, or from about 50 µm to about 100 µm, or from about 10 µm to about 90 µm, or from about 10 µm to about 80 µm, or from about 10 µm to about 70 µm, or from about 10 µm to about 60 µm, or from about 10 µm to about 50 µm. In preferred embodiments, each aperture has a diameter in a range of from about 10 µm to about 10,000 µm, or from about 25 µm to about 1,000 µm, or from about 50 µm to about 500 µm.

In embodiments, the apertures have a center-to-center spacing in a range of from about 20 µm to about 200 µm, or from about 20 µm to about 100 µm, or from about 24 µm to about 160 µm, or from about 28 µm to about 120 µm, or from about 32 µm to about 80 µm, or from about 20 µm to about 160 µm, or from about 20 µm to about 120 µm, or from about 20 µm to about 80 µm, or from about 24 µm to about 200 µm, or from about 28 µm to about 200 µm, or from about 32 µm to about 200 µm. In preferred embodiments, the apertures have a center-to-center spacing in a range of from about 20 µm to about 200 µm, or from about 24 µm to about 160 µm, or from about 32 µm to about 80 µm. The term center-to-center spacing refers to the distance between the center of a first aperture and the center of another aperture, in particular, the next closest or proximate or adjacent aperture to the first aperture. In embodiments, the center-to-center spacing is measured in a plane oriented transversely or, preferably, perpendicularly to the direction in which the apertures extend through the thickness of the article 10. In embodiments, the center of each aperture corresponds to a centroid of the cross section of the aperture in the plane along which the center-to-center spacing is measured.

In embodiments in which the article 10 has more than one bleach region or aperture, for example two first bleached regions 36 or apertures, the two first bleached regions 36 or apertures can have an aperture spacing therebetween. The aperture spacing in embodiments can be at least 500 µm (0.5 mm). In other embodiments, the aperture spacing between bleached regions 36 can be 1,000 µm (1 mm) or greater. In some embodiments the aperture spacing between bleached regions or lines can vary from about 500 µm (0.5 mm) to about 10,000 μm (10 mm). In embodiments in which the apertures have the diameters (i.e., 10 μm) and the center-to-center spacings (i.e., a range of from about 20 μm to about 200 μm) disclosed herein, the apertures can have an aperture spacing in a range of from about 10 μm to about 190 μm, or from about 12 μm to about 152 μm, or from about 16 μm to about 76 μm. In embodiments, the aperture spacing is the shortest distance measured between the outermost peripheries of the apertures. In particular, the aperture spacing is measured between the outermost periphery of a first aperture and the outermost periphery of another aperture, in particular, the next closest or proximate or adjacent aperture to the first aperture. The outermost periphery of an aperture can refer to an outermost portion of the aperture in which the transmittance thereof is at least 1%, or 2.5%, or 5%, or 7.5% greater than the transmittance of the unbleached region adjacent to or surrounding the aperture.

A first portion 38 of the article 10 is a portion of the article 10 that has been bleached as a result of the interaction between the article 10 and the beam from the laser. A second portion 42 of the article 10 is a region of the article that has not been exposed to the beam from the laser. The first portion 38 and the second portion 42 are sometimes referred to herein as a bleached region and an unbleached region, respectively. It will be understood that, while the article 10 is depicted in FIG. 1 as a rectangular substrate, the present disclosure is not so limited. Rather, the article 10 may be contoured such that one or more of the top surface 14, the bottom surface 18, the front surface 22, the rear surface 26, the side surface 30, and the side surface 34 are provided with inflection point(s), undulations, bevels, curvature, and/or other perturbations such that a given one of the surfaces may not lie entirely along a single plane.

Figure 2:
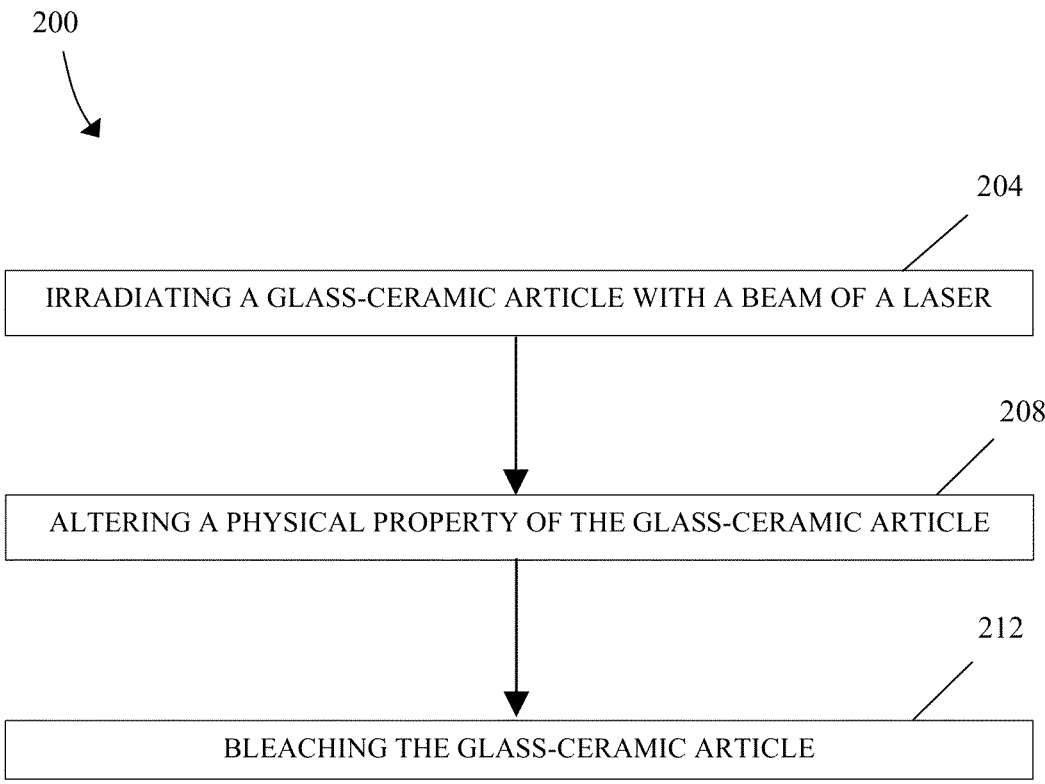
FIG. 2 is a flow diagram illustrating a method of bleaching the article of FIG. 1, according to one example.

With reference to FIG. 2, a method 200 of bleaching a glass-ceramic article, such as the article 10 of FIG. 1, can include irradiating the glass-ceramic article with a beam from a laser (block 204). The glass-ceramic article comprises a bulk having an amorphous silicate glass phase and a crystalline phase. The crystalline phase in embodiments includes a species of $M_xWO_3$ where $0 < x < 1$ and M is an intercalated dopant cation, such as one or more of H, Li, Na, K, Rb, Cs, Ca, Sr, Ba, Zn, Ag, Au, Cu, Sn, Cd, In, Tl, Pb, Bi, Th, La, Pr, Nd, Sm, Eu, Gd, Dy, Ho, Er, Tm, Yb, Lu, U, Ti, V, Cr, Mn, Fe, Ni, Pd, Se, Ta, and/or Ce. The irradiating the glass-ceramic article includes directing the beam of the laser into a thickness of the glass-ceramic article to form an aperture, such as the first bleached region 36 and/or the second bleached region 37 of FIG. 1, in the bulk.

The beam comprises a wavelength configured to couple into an absorption band of the crystalline phase. For example, the beam in embodiments includes a wavelength that couples into an absorption band of the species of $M_xWO_3$. The beam can also be configured to couple into an absorption band of other constituents of the bulk. For example, the wavelength of the beam also couples into an absorption band of the chemical hydroxyl groups (i.e., OH groups) in the bulk. The wavelength of the beam of the laser in embodiments is within a range in which an absorbance of the bulk at a distance of 1 mm and at the first wavelengths is greater than 4 and less than 10. In embodiments, the wavelength of the beam of the laser is within a range of 2 μm and 3 μm, or within a range of 2.6 μm and 2.75 μm, or within a range of 2.68 μm and 2.72 μm.

In embodiments, the directing the beam of the laser comprises directing a focused beam within the thickness of the glass-ceramic article to form the aperture. It is contemplated that the glass-ceramic article can be of standardized dimensions such that the beam from the laser can be focused in a calibration step prior to initiation of the method 200. The directing the beam of the laser in embodiments can comprise directing a defocused beam through the thickness of the glass-ceramic article to form the aperture in the bulk. In such embodiments, the focus of the beam can be in front or behind the glass-ceramic article so that a defocused portion of the beam passes through the thickness of the article. The directing the beam of the laser in embodiments can comprise directing a collimated beam through the thickness of the glass-ceramic article to form the aperture in the bulk. It will be appreciated that any one or more of the focused beam, the defocused beam, the collimated beam, and other beam configurations can be directed into the thickness of the glass-ceramic article to form the aperture.

The directing of the beam of the laser is configured to alter at least one of a physical property and a chemical property of the glass-ceramic article with the beam from the laser (block 208). The method 200 in embodiment can optionally include translating or moving at least one of the laser and the glass-ceramic article to form aperture. The translation or movement can include vertical translation, horizontal translation, or combinations thereof to alter the position of the beam relative to the glass-ceramic article. The method 200 of bleaching the glass-ceramic article can terminate with bleaching of the glass-ceramic article as a result of the alteration of the at least one of a physical property and a chemical property of the glass-ceramic article (block 212). The method 200 in embodiments can optionally include heat treating the glass-ceramic article to 400° C. for 1 hour after the irradiating. Furthermore, the bleached article can subsequently be chemically strengthened by ion exchange. The bleached article can be ion exchanged in a molten salt bath comprising mixtures of lithium nitrate, sodium nitrate, and potassium nitrate between a temperature of 360 and 450° C. for between 0.25 and 25 hours. In embodiments, the ion exchange bath is substantially free of lithium nitrate. In embodiments, the ion exchange bath can also contain silicic acid, sodium nitrite, potassium nitrite, silver nitrate, or mixtures thereof. For example, after bleaching the part can be immersed in a salt bath comprising 80 wt % potassium nitrate, 19.9% sodium nitrate, and 0.1% silicic acid at a temperature of 390° C. for 8 hours to strengthen the part and increase its scratch resistance.

Laser Bleaching Techniques

According to embodiments, glass-ceramic articles are processed in a way to optically bleach at least one discrete region in the article. Laser bleaching of glass-ceramics can occur due to a number of mechanisms or processes.

In absorbing glass-ceramic materials, such as the glass-ceramic compositions disclosed herein, the oxidation state of an ion (e.g., metal ion or ion complex such as tungstate or molybdate) can be altered by the laser bleaching. The ion can directly absorb the laser energy and change oxidation state, or it can undergo a change in oxidation due to absorption by another constituent of the glass-ceramic and interaction (e.g., thermally or via electron transfer) with the absorbing constituent. For example, laser bleaching can initiate a redox reaction where an absorbing ion (e.g., a metal ion) is either oxidized or reduced from an absorbing or colored ion to a colorless or less intensely colored ion within a given wavelength spectrum (e.g., the visible spectrum). In various examples, the beam from the laser can be absorbed by hydroxyl group (e.g., —OH groups) within the glass-ceramic article, which in turn leads to a thermal event that causes or initiates a redox reaction between tungsten and/or other multivalent species in the glass-ceramic article that can donate and/or accept electrons from other components present in the glass-ceramic article (e.g., $SnO_2$). It is noted that some crystals of the type $M_xWO_3$, which is discussed further herein, may absorb at the wavelength of the laser beam. In such instances, the $M_xWO_3$ crystals may absorb energy from the laser beam, heat as a result of the energy absorption, and cause decomposition of the crystal, thereby resulting in alkali de-intercalation from the crystal and dissolution of the alkali into the glass. In some examples, the glass-ceramic article can experience an electron trapping effect as a result of the interaction of the laser beam with the glass-ceramic article in which electron capture by the absorbing ion or electron transfer from the absorbing ion leads to a change in oxidation state that increases optical transmittance within the given wavelength range in the region exposed to the beam of the laser.

In absorbing glass-ceramic materials that include at least one cation in a crystalline phase, bleaching can occur through a process of cation de-intercalation. In the cation de-intercalation process, the cation can be liberated from the crystals of the glass-ceramic article, thereby leaving behind an oxidized metal oxide (e.g., tungsten oxide) in regions of the glass-ceramic article that have been bleached. The de-intercalated cation in embodiments can also undergo a change in oxidation state.

In absorbing glass-ceramic materials, upon exposure to the beam from the laser, the crystals within the glass-ceramic article that are within the path of the laser beam can be obliterated such that constituents of the crystals are dissolved back into the glass, thereby resulting in dissolution of the crystals, which may be referred to as crystal amorphization or vitrification.

Absorbing glass-ceramic materials can be bleached by exposing the glass-ceramic material to thermal energy. For example, laser bleaching can provide the thermal energy for forming bleached regions in a glass-ceramic material. It is possible to accomplish laser-induced bleaching by locally heating the glass to a temperature that is above a softening point of the glass (e.g., about 1000° C. in embodiments). In embodiments, laser-induced bleaching is accomplished by locally heating the glass to a temperature above the liquidus temperature of one or more of the crystalline phases of the glass-ceramic material (e.g., from about 1100° C. to about 1200° C.). Heating the glass to a temperature above the softening point of the glass causes the glass to become transparent. Such intense heating may obliterate or remelt the crystals within the path of the laser beam and thereby return the constituents of the crystals to the glass.

In absorbing glass-ceramic materials, bleaching can also occur when glass-ceramic is converted into glass by rapid heating and cooling, including when the temperature of the region exposed to the beam of the laser is less than the temperature at the softening point. The rapid heating and cooling can be accomplished by exposing the glass-ceramic to a beam from a laser for a time frame that is sufficiently long to convert the glass-ceramic into glass, but sufficiently short to maintain a local temperature at the point of heating to a temperature below the softening temperature. For example, localized thermal heating to a localized temperature by one or more laser radiation sources can be used to dissolve or re-solubilize (e.g., through remelting) various small crystalline phases (e.g., crystallites, micrometer-sized crystals (10 micrometers or less in cross-sectional dimension) or nanometer-sized crystals (100 nanometers or less in cross sectional dimension)) in discrete localized regions of glass or glass-ceramic substrates exposed to the beam of the laser. While the present disclosure is not to be limited by a scientific principle or theory, in embodiments, localized heating of discrete regions of substrates to a localized temperature in excess of the global temperature results in a reversible redox reaction within the glass or glass-ceramic material that erases (e.g., dissociates, decomposes, solubilizes, or otherwise eliminates) a chromophore(s) in the form of small crystals that gives rise to visible absorbance. The term "global temperature," as used herein, is intended to refer to a bulk or average temperature of the glass-ceramic article as measured at a location on the glass-ceramic article that is remote from a region of the glass-ceramic article that is being actively bleached with the beam from the laser. When the chromophores are erased, absorbance is reduced in the substrate, and average internal optical transmittance is increased. In embodiments, the rate of heating or cooling can be varied by varying the power or degree of focusing of a CW (continuous wave) laser, or by varying the time of exposure of the glass-ceramic article to the laser beam.

Bleaching can be achieved using any suitable apparatus or system to increase the average internal optical transmittance in the discrete region. In embodiments, bleaching is achieved by thermally treating the discrete region. Such thermal treatment can be performed using those energy sources known in the art, such as, but not limited to, furnaces, flames such as gas flames, resistance furnaces, lasers, microwaves, or the like. Laser bleaching has been determined to provide substrates with discrete regions having increased the average internal optical transmittance after bleaching and can provide greater resolution of bleached regions.

Bleachable Glass-Ceramic Compositions with High Dynamic Range

Non-limiting compositions of glass-ceramic materials that are bleachable and provide optical stability according to the principles of the disclosure are listed below in Table 1. In particular, Table 1 lists various mixed molybdenum-tungsten glass-ceramic compositions (Samples 1-99) that each include a combination of $WO_3$ and $MoO_3$, among other constituents, which are reported in mol %. According to implementations of the disclosure, these compositions include specific dopant levels and ratios to achieve a high dynamic range. These compositions are bleachable and provide optical stability (i.e., retained transmittance) subsequent to heat treatment such as from annealing and/or chemical strengthening via ion exchange.

TABLE 1

| | 1 | 2 | 3 | 4 | 5 | 6 | 7 | 8 | 9 | 10 |
|---|---|---|---|---|---|---|---|---|---|---|
| $SiO_2$ | 63.444 | 63.144 | 62.844 | 62.544 | 62.894 | 62.644 | 63.314 | 63.114 | 62.914 | 63.164 |
| $Al_2O_3$ | 10.827 | 10.827 | 10.827 | 10.827 | 10.827 | 10.827 | 10.827 | 10.827 | 10.827 | 10.827 |
| $B_2O_3$ | 9.376 | 9.376 | 9.376 | 9.376 | 9.376 | 9.376 | 9.376 | 9.376 | 9.376 | 9.376 |
| $Li_2O$ | 6.348 | 6.348 | 6.348 | 6.348 | 6.348 | 6.348 | 6.351 | 6.351 | 6.351 | 6.351 |
| $Na_2O$ | 4.909 | 4.909 | 4.909 | 4.909 | 4.909 | 4.909 | 4.906 | 4.906 | 4.906 | 4.906 |
| $SnO_2$ | 0.070 | 0.070 | 0.070 | 0.070 | 0.070 | 0.070 | 0.100 | 0.100 | 0.100 | 0.100 |
| $WO_3$ | 3.900 | 4.200 | 4.500 | 4.800 | 4.200 | 4.200 | 4.000 | 4.200 | 4.400 | 4.400 |

TABLE 1-continued

| | | | | | | | | | | |
|---|---|---|---|---|---|---|---|---|---|---|
| CaO | 0.126 | 0.126 | 0.126 | 0.126 | 0.126 | 0.126 | 0.126 | 0.126 | 0.126 | 0.126 |
| MoO$_3$ | 1.000 | 1.000 | 1.000 | 1.000 | 1.250 | 1.500 | 1.000 | 1.000 | 1.000 | 0.750 |
| TOTAL | 100 | 100 | 100 | 100 | 100 | 100 | 100 | 100 | 100 | |
| R$_2$O—Al$_2$O$_3$ | 0.430 | 0.430 | 0.430 | 0.430 | 0.430 | 0.430 | 0.430 | 0.430 | 0.430 | 0.430 |

| | 11 | 12 | 13 | 14 | 15 | 16 | 17 | 18 | 19 | 20 |
|---|---|---|---|---|---|---|---|---|---|---|
| SiO$_2$ | 62.714 | 62.764 | 62.564 | 62.364 | 62.614 | 63.114 | 62.914 | 62.514 | 62.414 | 62.214 |
| Al$_2$O$_3$ | 10.827 | 10.827 | 10.827 | 10.827 | 10.827 | 10.827 | 10.827 | 10.827 | 10.827 | 10.827 |
| B$_2$O$_3$ | 9.376 | 9.376 | 9.376 | 9.376 | 9.376 | 9.376 | 9.376 | 9.376 | 9.376 | 9.376 |
| Li$_2$O | 6.351 | 6.351 | 6.351 | 6.351 | 6.351 | 6.351 | 6.351 | 6.351 | 6.351 | 6.351 |
| Na$_2$O | 4.906 | 4.906 | 4.906 | 4.906 | 4.906 | 4.906 | 4.906 | 4.906 | 4.906 | 4.906 |
| SnO$_2$ | 0.100 | 0.100 | 0.100 | 0.100 | 0.100 | 0.100 | 0.100 | 0.100 | 0.200 | 0.400 |
| WO$_3$ | 4.600 | 4.800 | 5.000 | 5.200 | 5.200 | 5.200 | 5.400 | 5.800 | 5.800 | 5.800 |
| CaO | 0.126 | 0.126 | 0.126 | 0.126 | 0.126 | 0.126 | 0.126 | 0.126 | 0.126 | 0.126 |
| MoO$_3$ | 1.000 | 0.750 | 0.750 | 0.750 | 0.500 | 0.000 | 0.000 | 0.000 | 0.000 | 0.000 |
| TOTAL | 100 | 100 | 100 | 100 | 100 | 100 | 100 | 100 | 100 | 100 |
| R$_2$O—Al$_2$O$_3$ | 0.430 | 0.430 | 0.430 | 0.430 | 0.430 | 0.430 | 0.430 | 0.430 | 0.430 | 0.430 |

| | 21 | 22 | 23 | 24 | 25 | 26 | 27 | 28 | 29 | 30 |
|---|---|---|---|---|---|---|---|---|---|---|
| SiO$_2$ | 62.064 | 61.814 | 61.664 | 61.214 | 61.614 | 61.414 | 61.214 | 61.539 | 61.577 | 61.595 |
| Al$_2$O$_3$ | 10.827 | 10.827 | 10.827 | 10.827 | 10.827 | 10.827 | 10.827 | 10.827 | 10.827 | 10.827 |
| B$_2$O$_3$ | 9.376 | 9.376 | 9.376 | 9.376 | 9.376 | 9.376 | 9.376 | 9.376 | 9.376 | 9.376 |
| Li$_2$O | 6.351 | 6.351 | 6.351 | 6.351 | 6.351 | 6.351 | 6.351 | 6.351 | 6.351 | 6.351 |
| Na$_2$O | 4.906 | 4.906 | 4.906 | 4.906 | 4.906 | 4.906 | 4.906 | 4.906 | 4.906 | 4.906 |
| SnO$_2$ | 0.400 | 0.400 | 0.400 | 0.400 | 0.600 | 0.800 | 1.000 | 0.600 | 0.600 | 0.600 |
| WO$_3$ | 5.800 | 6.200 | 6.200 | 6.800 | 6.200 | 6.200 | 6.200 | 6.200 | 6.200 | 6.200 |
| CaO | 0.126 | 0.126 | 0.126 | 0.126 | 0.126 | 0.126 | 0.126 | 0.126 | 0.126 | 0.126 |
| MoO$_3$ | 0.150 | 0.000 | 0.150 | 0.000 | 0.000 | 0.000 | 0.000 | 0.075 | 0.038 | 0.019 |
| TOTAL | 100 | 100 | 100 | 100 | 100 | 100 | 100 | 100 | 100 | 100 |
| R$_2$O—Al$_2$O$_3$ | 0.430 | 0.430 | 0.430 | 0.430 | 0.430 | 0.430 | 0.430 | 0.430 | 0.430 | 0.430 |

| | 31 | 32 | 33 | 34 | 35 | 36 | 37 | 38 | 39 | 40 |
|---|---|---|---|---|---|---|---|---|---|---|
| SiO$_2$ | 62.514 | 62.414 | 62.314 | 62.214 | 62.114 | 62.265 | 62.564 | 62.714 | 62.864 | 62.514 |
| Al$_2$O$_3$ | 10.827 | 10.827 | 10.827 | 10.827 | 10.827 | 10.827 | 10.827 | 10.827 | 10.827 | 10.827 |
| B$_2$O$_3$ | 9.376 | 9.376 | 9.376 | 9.376 | 9.376 | 9.376 | 9.376 | 9.376 | 9.376 | 9.376 |
| Li$_2$O | 6.151 | 6.251 | 6.351 | 6.451 | 6.551 | 6.351 | 6.150 | 6.000 | 5.850 | 6.150 |
| Na$_2$O | 4.906 | 4.906 | 4.906 | 4.906 | 4.906 | 4.906 | 4.907 | 4.907 | 4.907 | 4.907 |
| SnO$_2$ | 0.200 | 0.200 | 0.200 | 0.200 | 0.200 | 0.200 | 0.200 | 0.200 | 0.200 | 0.250 |
| WO$_3$ | 5.800 | 5.800 | 5.800 | 5.800 | 5.800 | 5.800 | 5.800 | 5.800 | 5.800 | 5.800 |
| CaO | 0.126 | 0.126 | 0.126 | 0.126 | 0.126 | 0.175 | 0.126 | 0.126 | 0.126 | 0.126 |
| MoO$_3$ | 0.100 | 0.100 | 0.100 | 0.100 | 0.100 | 0.100 | 0.050 | 0.050 | 0.050 | 0.050 |
| TOTAL | 100 | 100 | 100 | 100 | 100 | 100 | 100 | 100 | 100 | 100 |
| R$_2$O—Al$_2$O$_3$ | 0.230 | 0.330 | 0.430 | 0.530 | 0.630 | 0.430 | 0.230 | 0.080 | −0.070 | 0.230 |

| | 41 | 42 | 43 | 44 | 45 | 46 | 47 | 48 | 49 | 50 |
|---|---|---|---|---|---|---|---|---|---|---|
| SiO$_2$ | 62.464 | 62.264 | 61.964 | 64.864 | 65.164 | 62.814 | 62.789 | 62.764 | 62.764 | 62.514 |
| Al$_2$O$_3$ | 10.827 | 10.827 | 10.827 | 9.827 | 9.827 | 10.827 | 10.827 | 10.827 | 10.827 | 10.827 |
| B$_2$O$_3$ | 9.376 | 9.376 | 9.376 | 9.376 | 9.376 | 9.376 | 9.376 | 9.376 | 9.376 | 9.376 |
| Li$_2$O | 6.150 | 6.150 | 6.150 | 5.150 | 5.150 | 5.850 | 5.850 | 5.850 | 5.850 | 5.850 |
| Na$_2$O | 4.907 | 4.907 | 4.907 | 4.907 | 4.907 | 4.907 | 4.907 | 4.907 | 4.907 | 4.907 |
| SnO$_2$ | 0.300 | 0.200 | 0.200 | 0.200 | 0.200 | 0.200 | 0.200 | 0.200 | 0.250 | 0.200 |
| WO$_3$ | 5.800 | 6.100 | 6.400 | 5.500 | 5.200 | 5.800 | 5.800 | 5.800 | 5.800 | 6.100 |
| CaO | 0.126 | 0.126 | 0.126 | 0.126 | 0.126 | 0.126 | 0.126 | 0.126 | 0.126 | 0.126 |
| MoO$_3$ | 0.050 | 0.050 | 0.050 | 0.050 | 0.050 | 0.100 | 0.125 | 0.150 | 0.100 | 0.100 |
| TOTAL | 100 | 100 | 100 | 100 | 100 | 100 | 100 | 100 | 100 | 100 |
| R$_2$O—Al$_2$O$_3$ | 0.230 | 0.230 | 0.230 | 0.230 | 0.230 | −0.070 | −0.070 | −0.070 | −0.070 | −0.070 |

| | 51 | 52 | 53 | 54 | 55 | 56 | 57 | 58 | 59 | 60 |
|---|---|---|---|---|---|---|---|---|---|---|
| SiO$_2$ | 62.464 | 62.914 | 63.014 | 65.314 | 62.289 | 62.214 | 62.264 | 62.089 | 61.889 | 62.064 |
| Al$_2$O$_3$ | 10.827 | 10.827 | 10.827 | 9.827 | 10.827 | 10.827 | 10.827 | 10.827 | 10.827 | 10.827 |
| B$_2$O$_3$ | 9.376 | 9.376 | 9.376 | 9.376 | 9.376 | 9.376 | 9.376 | 9.376 | 9.376 | 9.376 |
| Li$_2$O | 5.850 | 5.750 | 5.650 | 4.850 | 6.000 | 6.000 | 6.000 | 6.000 | 6.000 | 6.000 |
| Na$_2$O | 4.907 | 4.907 | 4.907 | 4.907 | 4.907 | 4.907 | 4.907 | 4.907 | 4.907 | 4.907 |
| SnO$_2$ | 0.250 | 0.200 | 0.200 | 0.200 | 0.250 | 0.250 | 0.275 | 0.250 | 0.250 | 0.275 |

TABLE 1-continued

| | | | | | | | | | | |
|---|---|---|---|---|---|---|---|---|---|---|
| WO₃ | 6.100 | 5.800 | 5.800 | 5.300 | 6.100 | 6.100 | 6.100 | 6.300 | 6.500 | 6.300 |
| CaO | 0.126 | 0.126 | 0.126 | 0.126 | 0.126 | 0.126 | 0.126 | 0.126 | 0.126 | 0.126 |
| MoO₃ | 0.100 | 0.100 | 0.100 | 0.100 | 0.125 | 0.200 | 0.125 | 0.125 | 0.125 | 0.125 |
| | | | | | | | | | | |
| TOTAL | 100 | 100 | 100 | 100 | 100 | 100 | 100 | 100 | 100 | 100 |
| R₂O—Al₂O₃ | −0.070 | −0.170 | −0.270 | −0.070 | 0.080 | 0.080 | 0.080 | 0.080 | 0.080 | 0.080 |

| | 61 | 62 | 63 | 64 | 65 | 66 | 67 | 68 | 69 | 70 |
|---|---|---|---|---|---|---|---|---|---|---|
| SiO₂ | 61.864 | 62.039 | 62.014 | 65.139 | 65.064 | 65.089 | 64.939 | 64.739 | 64.889 | 64.689 |
| Al₂O₃ | 10.827 | 10.827 | 10.827 | 9.827 | 9.827 | 9.827 | 9.827 | 9.827 | 9.827 | 9.827 |
| B₂O₃ | 9.376 | 9.376 | 9.376 | 9.376 | 9.376 | 9.376 | 9.376 | 9.376 | 9.376 | 9.376 |
| Li₂O | 6.000 | 5.850 | 5.850 | 5.000 | 5.000 | 5.000 | 5.000 | 5.000 | 5.000 | 5.000 |
| Na₂O | 4.907 | 4.907 | 4.907 | 4.907 | 4.907 | 4.907 | 4.907 | 4.907 | 4.907 | 4.907 |
| SnO₂ | 0.275 | 0.250 | 0.275 | 0.200 | 0.200 | 0.250 | 0.200 | 0.200 | 0.250 | 0.250 |
| WO₃ | 6.500 | 6.500 | 6.500 | 5.300 | 5.300 | 5.300 | 5.500 | 5.700 | 5.500 | 5.700 |
| CaO | 0.126 | 0.126 | 0.126 | 0.126 | 0.126 | 0.126 | 0.126 | 0.126 | 0.126 | 0.126 |
| MoO₃ | 0.125 | 0.125 | 0.125 | 0.125 | 0.200 | 0.125 | 0.125 | 0.125 | 0.125 | 0.125 |
| | | | | | | | | | | |
| TOTAL | 100 | 100 | 100 | 100 | 100 | 100 | 100 | 100 | 100 | 100 |
| R₂O—Al₂O₃ | 0.080 | −0.070 | −0.070 | 0.080 | 0.080 | 0.080 | 0.080 | 0.080 | 0.080 | 0.080 |

| | 71 | 72 | 73 | 74 | 75 | 76 | 77 | 78 | 79 | 80 |
|---|---|---|---|---|---|---|---|---|---|---|
| SiO₂ | 64.889 | 64.839 | 65.139 | 65.089 | 65.214 | 65.164 | 65.114 | 65.214 | 65.189 | 65.139 |
| Al₂O₃ | 9.827 | 9.827 | 9.827 | 9.827 | 9.827 | 9.827 | 9.827 | 9.827 | 9.827 | 9.827 |
| B₂O₃ | 9.376 | 9.376 | 9.376 | 9.376 | 9.376 | 9.376 | 9.376 | 9.376 | 9.376 | 9.376 |
| Li₂O | 4.850 | 4.850 | 4.925 | 4.925 | 4.850 | 4.850 | 4.850 | 4.750 | 4.850 | 4.850 |
| Na₂O | 4.907 | 4.907 | 4.907 | 4.907 | 4.907 | 4.907 | 4.907 | 4.907 | 4.907 | 4.907 |
| SnO₂ | 0.200 | 0.250 | 0.200 | 0.200 | 0.200 | 0.200 | 0.200 | 0.200 | 0.225 | 0.225 |
| WO₃ | 5.700 | 5.700 | 5.300 | 5.300 | 5.300 | 5.300 | 5.300 | 5.300 | 5.300 | 5.300 |
| CaO | 0.126 | 0.126 | 0.126 | 0.126 | 0.126 | 0.126 | 0.126 | 0.126 | 0.126 | 0.126 |
| MoO₃ | 0.125 | 0.125 | 0.200 | 0.250 | 0.200 | 0.250 | 0.300 | 0.300 | 0.200 | 0.250 |
| | | | | | | | | | | |
| TOTAL | 100 | 100 | 100 | 100 | 100 | 100 | 100 | 100 | 100 | 100 |
| R₂O—Al₂O₃ | −0.070 | −0.070 | 0.005 | 0.005 | −0.070 | −0.070 | −0.070 | −0.170 | −0.070 | −0.070 |

| | 81 | 82 | 83 | 84 | 85 | 86 | 87 | 88 | 89 | 90 |
|---|---|---|---|---|---|---|---|---|---|---|
| SiO₂ | 64.964 | 66.239 | 66.414 | 66.589 | 67.589 | 67.764 | 67.939 | 68.939 | 69.114 | 69.289 |
| Al₂O₃ | 9.827 | 9.327 | 9.327 | 9.327 | 8.827 | 8.827 | 8.827 | 8.327 | 8.327 | 8.327 |
| B₂O₃ | 9.376 | 9.376 | 9.376 | 9.376 | 9.376 | 9.376 | 9.376 | 9.376 | 9.376 | 9.376 |
| Li₂O | 4.850 | 5.000 | 5.000 | 5.000 | 5.000 | 5.000 | 5.000 | 5.000 | 5.000 | 5.000 |
| Na₂O | 4.907 | 4.407 | 4.407 | 4.407 | 3.907 | 3.907 | 3.907 | 3.407 | 3.407 | 3.407 |
| SnO₂ | 0.200 | 0.200 | 0.200 | 0.200 | 0.200 | 0.200 | 0.200 | 0.200 | 0.200 | 0.200 |
| WO₃ | 5.500 | 5.125 | 4.950 | 4.775 | 4.775 | 4.600 | 4.425 | 4.425 | 4.250 | 4.075 |
| CaO | 0.126 | 0.126 | 0.126 | 0.126 | 0.126 | 0.126 | 0.126 | 0.126 | 0.126 | 0.126 |
| MoO₃ | 0.250 | 0.200 | 0.200 | 0.200 | 0.200 | 0.200 | 0.200 | 0.200 | 0.200 | 0.200 |
| | | | | | | | | | | |
| TOTAL | 100 | 100 | 100 | 100 | 100 | 100 | 100 | 100 | 100 | 100 |
| R₂O—Al₂O₃ | −0.070 | 0.080 | 0.080 | 0.080 | 0.080 | 0.080 | 0.080 | 0.080 | 0.080 | 0.080 |

| | 91 | 92 | 93 | 94 | 95 | 96 | 97 | 98 | 99 |
|---|---|---|---|---|---|---|---|---|---|
| SiO₂ | 62.214 | 62.274 | 62.334 | 62.294 | 62.364 | 62.331 | 62.402 | 71.639 | 71.989 |
| Al₂O₃ | 10.827 | 10.827 | 10.827 | 10.827 | 10.827 | 10.827 | 10.827 | 7.327 | 7.327 |
| B₂O₃ | 9.376 | 9.376 | 9.376 | 9.376 | 9.376 | 9.376 | 9.376 | 9.376 | 9.376 |
| Li₂O | 6.000 | 6.000 | 6.000 | 5.921 | 5.850 | 5.921 | 5.850 | 5.000 | 5.000 |
| Na₂O | 4.907 | 4.907 | 4.907 | 4.907 | 4.907 | 4.907 | 4.907 | 2.407 | 2.407 |
| SnO₂ | 0.250 | 0.250 | 0.250 | 0.250 | 0.250 | 0.250 | 0.250 | 0.200 | 0.200 |
| WO₃ | 6.100 | 6.100 | 6.100 | 6.100 | 6.100 | 6.100 | 6.100 | 3.725 | 3.375 |
| CaO | 0.126 | 0.066 | 0.006 | 0.126 | 0.126 | 0.126 | 0.126 | 0.126 | 0.126 |
| MoO₃ | 0.200 | 0.200 | 0.200 | 0.200 | 0.200 | 0.163 | 0.163 | 0.200 | 0.200 |
| | | | | | | | | | |
| TOTAL | 100 | 100 | 100 | 100 | 100 | 100 | 100 | 100 | 100 |
| R₂O—Al₂O₃ | 0.080 | 0.080 | 0.080 | 0.001 | −0.070 | 0.001 | −0.070 | 0.080 | 0.080 |

The bleachable, high-contrast ratio glass-ceramic compositions disclosed in Table 1 enable the fabrication of glass-ceramic articles that have one or more highly transparent regions bleached into a monolithic substrate that is highly opaque at visible and near infrared (NIR) wavelengths. The bleached region or aperture in embodiments can have a transmittance of at least 60% at wavelengths from 500 nm to 1100 nm, or at wavelengths from 450 nm to 1500 nm, or at wavelengths from 450 nm to 1750 nm, or at wavelengths from 400 nm to 1900 nm, or at wavelengths from 380 nm to 2500 nm (i.e., across the entire visible and NIR spectrum). The bleached region in embodiments can have a transmittance of at least 70% at wavelengths from 500 nm to 1100 nm, or at wavelengths from 450 nm to 1500 nm, or at wavelengths from 450 nm to 1750 nm, or at wavelengths from 400 nm to 1900 nm, or at wavelengths from 400 nm to 2400 nm. The bleached region in embodiments can have a transmittance of at least 80% at wavelengths from 500 nm to 1100 nm, or at wavelengths from 450 nm to 1500 nm, or at wavelengths from 450 nm to 1750 nm, or at wavelengths from 425 nm to 1900 nm, or at wavelengths from 425 nm to 2400 nm. The bleached region in embodiments can have a transmittance of at least 85% at wavelengths from 500 nm to 1100 nm, or at wavelengths from 450 nm to 1500 nm, or at wavelengths from 450 nm to 1750 nm, or at wavelengths from 450 nm to 1900 nm, or at wavelengths from 450 nm to 2400 nm. The bleached region in embodiments can have a transmittance of at least 90% at wavelengths from 600 nm to 1100 nm, or at wavelengths from 600 nm to 1500 nm, or at wavelengths from 600 nm to 1900 nm, or at wavelengths from 600 nm to 2400 nm. The bleached region in embodiments can have a transmittance of at least 85% over at least a 100 nm wide band anywhere between 400 nm and 2400 nm. The transmittances reported in this paragraph are each at a distance of 1.1 mm.

The unbleached region in embodiments can have a transmittance of at most 0.1% (or an absorbance of at least 3) at wavelengths from 500 nm to 1100 nm, or at wavelengths from 450 nm to 1500 nm, or at wavelengths from 450 nm to 1750 nm, or at wavelengths from 400 nm to 1900 nm, or at wavelengths from 380 nm to 2400 nm (i.e., across the entire visible and NIR spectrum). The unbleached region in embodiments can have a transmittance of at most 0.01% (or an absorbance of at least 4) at wavelengths from 500 nm to 1100 nm, or at wavelengths from 450 nm to 1500 nm, or at wavelengths from 450 nm to 1750 nm, or at wavelengths from 400 nm to 1900 nm, or at wavelengths from 400 nm to 2400 nm. The unbleached region in embodiments can have a transmittance of at most 0.005% (or an absorbance of at least 4.3) at wavelengths from 500 nm to 1100 nm, or at wavelengths from 450 nm to 1500 nm, or at wavelengths from 450 nm to 1750 nm, or at wavelengths from 400 nm to 1900 nm, or at wavelengths from 400 nm to 2400 nm. The unbleached region in embodiments can have a transmittance of at most 0.001% (or an absorbance of at least 5) at wavelengths from 500 nm to 1100 nm, or at wavelengths from 450 nm to 1500 nm, or at wavelengths from 450 nm to 1750 nm, or at wavelengths from 425 nm to 1900 nm, or at wavelengths from 425 nm to 2400 nm. The transmittances reported in this paragraph are each at a distance of 1.1 mm.

The glass-ceramic composition in an exemplary embodiment comprises: $SiO_2$ from about 55 mol % to about 75 mol %; $Al_2O_3$ from about 3 mol % to about 15 mol %; $B_2O_3$ from about 5 mol % to about 15 mol %; $R_2O$ from about 1 mol % to about 13 mol %, where $R_2O$ is one or more of $Li_2O$, $Na_2O$, $K_2O$, $Rb_2O$, $Cs_2O$; CaO from about 0 mol % to about 0.5 mol %; $SnO_2$ from about 0.01 mol % to about 1.5 mol %; $WO_3$ from about 1 mol % to about 10 mol %; and $MoO_3$ from about 0 mol % to about 3 mol %. In this embodiment, the amount of $R_2O$ minus the amount of $Al_2O_3$ ranges from about −1 mol % to about 1 mol %.

The glass-ceramic composition in another embodiment comprises: $SiO_2$ from about 57 mol % to about 74 mol %; $Al_2O_3$ from about 4 mol % to about 14 mol %; $B_2O_3$ from about 7 mol % to about 12 mol %; $R_2O$ from about 2 mol % to about 12 mol %, wherein $R_2O$ is one or more of $Li_2O$, $Na_2O$, $K_2O$, $Rb_2O$, $Cs_2O$; CaO from about 0.01 mol % to about 0.4 mol %; $SnO_2$ from about 0.025 mol % to about 0.75 mol %; $WO_3$ from about 3.25 mol % to about 9 mol %; and $MoO_3$ from about 0.05 mol % to about 2.5 mol %. In this embodiment, the amount of $R_2O$ minus the amount of $Al_2O_3$ ranges from about −0.75 mol % to about 0.75 mol %.

The glass-ceramic composition in a further embodiment comprises: $SiO_2$ from about 60 mol % to about 72 mol %; $Al_2O_3$ from about 5 mol % to about 12 mol %; $B_2O_3$ from about 8 mol % to about 11 mol %; $R_2O$ from about 3 mol % to about 11 mol %, wherein $R_2O$ is one or more of $Li_2O$, $Na_2O$, $K_2O$, $Rb_2O$, $Cs_2O$; CaO from about 0.05 mol % to about 0.2 mol %; $SnO_2$ from about 0.1 mol % to about 0.35 mol %; $WO_3$ from about 3.3 mol % to about 8 mol %; and $MoO_3$ from about 0.1 mol % to about 0.5 mol %. In this embodiment, the amount of $R_2O$ minus the amount of $Al_2O_3$ ranges from about −0.5 mol % to about 0.1 mol %.

The high-contrast ratio glass-ceramic compositions disclosed in Table 1 are readily bleachable by standard bleaching techniques. In other words, their strong absorbance was eliminated by laser bleaching, resulting in the formation of highly transparent regions with an average visible and NIR transmittance of greater than 85%. However, it was discovered that when the bleached samples formed from these compositions were then subjected to a subsequent heat treatment, such as an annealing step and/or an ion exchange step, their average transmittance diminished to levels less than 85% (i.e., the sample darkened). The laser bleaching technique disclosed herein was developed to prevent the high-contrast glass-ceramic compositions of Table 1 from darkening during subsequent heat treatment.

In some prior bleaching techniques, the sample is exposed to a mid-infrared (mid-IR) wavelength. This wavelength allows good penetration of the laser through the entire thickness of the sample and couples only into the absorption minima of the tungsten bronze crystal. This coupling can result in rapid bleaching from one surface to the other with nominal build thermal stress. Mechanistically, without being bound by theory, the laser exposure and the resultant local heating causes the alkali to be driven out of the tungsten bronze crystal and back into the glass matrix. This de-intercalation returns the tungsten bronze crystal back to a stoichiometric tungsten oxide that does not absorb in the visible or NIR regimes. As such, the sample is no longer heated by the mid-IR wavelength laser, making this prior bleaching technique a self-limiting process. It is believed that some of the tungsten oxide dissolves back into the glass as $W^{6+}$ cations, but much of it is believed to remain in a crystalline form.

The high-contrast glass-ceramic compositions disclosed herein are believed to have a higher concentration of tungsten bronze crystals than prior glass-ceramic compositions. Thus, when the glass-ceramic compositions of the present disclosure are bleached using the mid-IR wavelength of some prior bleaching techniques, there is in-turn a significantly higher fraction of crystalline tungsten oxide left in the glass. Accordingly, it is believed that during subsequent heat treatment a bleached glass-ceramic compositions of the present disclosure, there is higher probability of alkali re-intercalating back the into tungsten bronze crystals, thereby causing the absorbance of these crystals to increase.

It was discovered that when samples of the glass-ceramic compositions of the present disclosure were bleached using a gas oxygen torch flame (see discussion of Example 7 herein), the samples remained highly transparent even after a long-duration heat treatment (i.e., 400° C. for 2 hours plus 380° C. for 14 hours) selected to simulate annealing and ion exchange. It is believed that the flame bleached samples do not darken after subsequent heat treatment because the torch flame heats the samples to a higher temperature and/or a longer time (depending on how long the sample is held in the torch flame), resulting in de-intercalation of the alkali cations from the tungsten bronze crystals and a more complete dissolution of the tungsten oxide crystals back into the glass matrix. It could also be considered that the torch flame enables the glass-ceramic composition to be heated at or above the liquidus temperature of the tungsten crystals for a sufficient duration of time to fully amorphized the crystals.

Thus, there are fewer (or no) tungsten oxide crystals left for alkali re-intercalation during subsequent heat treatment. The fundamental difference between the torch flame and mid-IR laser wavelength of the prior bleaching techniques is that flame bleaching is not a self-limiting process. That is, the sample will continue to be heated until it is removed from the torch flame. In contrast, the prior laser bleaching techniques appear to enable the sample to get hot enough to de-intercalate the alkali out of the tungsten oxide crystals, but once the absorbance diminishes, the laser cannot heat the sample any further, resulting a lower dissolution of the tungsten oxide crystals. The difference in the concentration of tungsten in the glass matrix between a flame bleached sample and a sample laser bleached with a 2.62 μm laser is shown by comparing the peak corresponding to $WO^{4-}$ (around 1000 cm-1) in FIG. 16 discussed below with reference to Example 8. This result confirms that laser bleaching at 2.5 μm to 2.62 μm returns less tungsten in the glass matrix than flame bleaching.

Flame bleaching may not be an optimal process to bleach the high-contrast glass-ceramic compositions of the present disclosure because the technique can cause significant thermal stress and has a lower bleached feature resolution than laser bleaching. Experiments were conducted to explore techniques to overcome this issue. In particular, samples were heated using different laser wavelengths to try and achieve a higher local temperature so as to promote more complete dissolution of the tungsten oxide crystals after de-intercalation. In some experiments, the laser was tuned to the short-wavelength shoulder of the hydroxyl group (—OH) fundamental phonon absorption band at 2.8 μm. By exposing samples of the glass-ceramic compositions of the present disclosure at a wavelength of approximately 2.72 μm, it was discovered that with the appropriate power and focusing conditions, the absorbance of these laser bleached samples after subsequent heat treatment changed less than in samples laser bleached with the mid-IR wavelength of the prior laser bleaching techniques.

Without being bound by theory, the improved optical stability of the high contrast ratio glass-ceramic compositions of the present disclosure that have been laser bleached at longer wavelengths (e.g., 2.68 and 2.72 μm) is attributed to the fact that the laser is coupling both to the tungsten bronze crystal and the absorption edge of the chemical water or hydroxyl groups in the glass (i.e., the —OH absorption). Because the chemical hydroxyl absorption does not diminish with laser exposure, like that of the tungsten bronze crystals, this continuous absorption is believed to help increase the duration of time that the sample heats to a temperature at or above the liquidus of the tungsten oxide crystals, resulting in more complete dissolution. As previously described, when there is more complete dissolution of the tungsten oxide crystals in the glass (like in the flame bleached samples described in Example 7), there is increased optical stability after subsequent heat treatment such as annealing or other low temperature thermal processing steps like ion exchange.

In addition to the new laser bleaching method disclosed herein, the high contrast ratio glass-ceramic compositions of the present disclosure are uniquely configured to achieve high absorbance in the unbleached region (i.e., a transmittance of less than 0.001% in the visible and NIR regimes), high transmittance in the bleached regions (i.e., a transmittance of greater than 85% in the visible and NIR regimes), and optical stability in the bleached region after subsequent heat treatment (i.e., maintaining a transmittance of greater than 85% in the visible and NIR regimes). In general, three scenarios were encountered during development of the high contrast ratio glass-ceramic compositions of the present disclosure: (1) a material that failed to meet the absorbance requirement, met the transmittance requirement when bleached and was optically stable after subsequent heat treatment; (2) a material that met the absorbance requirement, failed to meet the transmittance requirement when bleached; and (3) a material that met the absorbance requirement and met the transmittance requirement when bleached, but does not meet the transmittance requirement after subsequent heat treatment. As used herein, the term "retained transmittance" refers to the transmittance through a glass-ceramic material after the material has been laser bleached and after the material has been subjected to a subsequent heat treatment of at least 400° C. for 1 hour. The retained transmittance is useful in the context of the present disclosure since it has been discovered that the transmittance of at least some absorbing glass-ceramic materials, such as the high-contrast ratio glass-ceramic compositions disclosed in Table 1, can change or diminish as a result of subsequent heat treatment, such as annealing and/or chemical strengthening via ion exchange.

To achieve a sufficiently high absorbance (overcoming scenario 1), the concentrations of tungsten, molybdenum, tin, excess alkali, and calcium are optimized. If there is insufficient alkali relative to alumina, there is not enough alkali to intercalate into the tungsten oxide crystals during the ceram step. As such, very little absorbance is formed. If there is too much alkali relative to alumina, then a higher stoichiometry or stoichiometric alkali tungstate is formed, which also has minimal absorbance. The level of calcium must also be optimized such that sufficient nucleation takes place to grow the tungsten bronze crystals, but not promote excess formation calcium tungstate ($CaWO_4$), that does not absorb visible or near-infrared wavelengths (the optimal concentration seems to be between 0.05 and 0.2 mol %).

If tungsten, molybdenum, and tin are too high in concentration, the glass-ceramic compositions can meet the absorbance requirement, but they will not bleach to a transmittance of greater than 85% across the visible and NIR regimes (scenario 2). Additionally, the concentration of iron in the glass should be minimized. Any trace iron will interact with the tungsten to form iron tungstate ($FeWO_4$), which has a strong visible absorbance that would prevent a transmittance of greater than 85% in the bleached regions.

Once the concentrations of tungsten, molybdenum, and tin are optimized, and the level of iron in the glass is reduced to less than 100 ppm (i.e., the glass ceramic is substantially free of iron), compositions configured to meet both the desired absorbance and transmittance in the unbleached and bleached states, respectively, can be realized. However, not all compositions that meet the desired transmittance and absorbance after laser bleaching retain a transmittance of greater than 85% after subsequent heat treatment (scenario 3). To address this issue, adjustments to $R_2O$—$Al_2O_3$ were made. In embodiments, a difference in the amount of the $R_2O$ and the $Al_2O_3$ in the glass-ceramic compositions disclosed herein ranges from about −1 mol % to about 1 mol %, or from about −0.75 mol % to about 0.75 mol %, or from about −0.5 mol % to about 0.1 mol %. It is believed that when there is a greater concentration of excess alkali, there is a higher probability of the alkali leaving the glass matrix and intercalating into the tungsten oxide crystals that may be present in the glass. When the glass is starved of alkali, once bleaching occurs, the glass matrix is a more favorable host for the alkali and in-turn there are less alkali available to partition back into remaining tungsten oxide crystals.

The glass-ceramic compositions disclosed in Table 1 achieve a high dynamic range between bleached and unbleached regions as a result of the specific dopant levels and ratios described above. These compositions are bleachable according to the laser bleaching technique disclosed herein so as to provide optical stability (i.e., retained transmittance) subsequent to heat treatment such as from annealing and/or chemical strengthening via ion exchange. The bleached region or aperture in embodiments comprises constituents of the silicate glass phase and the crystalline phase of the glass ceramic but is substantially free of the species of $M_xWO_3$. As used herein, an aperture that is "substantially free" of the indicated species is an aperture in which the species can be present but in a concentration that is low enough to achieve the specified retained transmission through the aperture.

The bleached region or aperture in embodiments can have a retained transmittance of at least 50% at wavelengths from 500 nm to 1100 nm, or at wavelengths from 450 nm to 1500 nm, or at wavelengths from 450 nm to 1750 nm, or at wavelengths from 400 nm to 1900 nm, or at wavelengths from 380 nm to 2500 nm (i.e., across the entire visible and NIR spectrum). The bleached region in embodiments can have a retained transmittance of at least 60% at wavelengths from 500 nm to 1100 nm, or at wavelengths from 450 nm to 1500 nm, or at wavelengths from 450 nm to 1750 nm, or at wavelengths from 400 nm to 1900 nm, or at wavelengths from 390 nm to 2500 nm. The bleached region in embodiments can have a retained transmittance of at least 70% at wavelengths from 500 nm to 1100 nm, or at wavelengths from 450 nm to 1500 nm, or at wavelengths from 450 nm to 1750 nm, or at wavelengths from 400 nm to 1900 nm, or at wavelengths from 400 nm to 2400 nm. The bleached region in embodiments can have a retained transmittance of at least 80% at wavelengths from 500 nm to 1100 nm, or at wavelengths from 450 nm to 1500 nm, or at wavelengths from 450 nm to 1750 nm, or at wavelengths from 425 nm to 1900 nm, or at wavelengths from 425 nm to 2400 nm. The bleached region in embodiments can have a retained transmittance of at least 85% at wavelengths from 500 nm to 1100 nm, or at wavelengths from 450 nm to 1500 nm, or at wavelengths from 450 nm to 1750 nm, or at wavelengths from 450 nm to 1900 nm, or at wavelengths from 450 nm to 2400 nm. The bleached region in embodiments can have a retained transmittance of at least 90% at wavelengths from 600 nm to 1100 nm, or at wavelengths from 600 nm to 1500 nm, or at wavelengths from 600 nm to 1900 nm, or at wavelengths from 600 nm to 2400 nm. The bleached region in embodiments can have a retained transmittance of at least 85% over at least a 100 nm wide band anywhere between 400 nm and 2400 nm. The transmittances reported in this paragraph are each at a distance of 1.1 mm.

EXAMPLES

The following examples represent certain non-limiting examples of the composition of the glass-ceramic articles and/or methods of bleaching the glass-ceramic articles of the present disclosure. The photographs discussed below with reference to FIGS. 3A, 3B, 4A, 4B, 5A-5C, 6A, and 6B were taken under the same illuminating conditions by placing a white tissue behind the referenced article and shining light at the article so as to illustrate the transmission and color therethrough.

Example 1

The glass compositions of Table 1 (Samples 1-99) were prepared by weighing the raw materials and mixing by turbula or ball mill for time durations ranging from 15 minutes to 60 minutes. The raw materials were melted in ambient air electric furnaces in platinum crucibles with silica lids for time durations between 5 hours and 24 hours. Some compositions were melted and then poured into water to "stretch" the glass and improve mixing. These compositions were then melted a second time and then poured onto a steel table to cool. Some glasses were formed into rolled sheet by pouring the glass onto a steel table and rolling it with a steel cylinder roller. Shims were sometimes placed under the roller to produce a certain thickness of sheet. Once the glass was formed, it was annealed in an ambient air electric oven at temperatures between 400 C and 500 C for time durations between 20 and 240 minutes. The glass was then cooled to room temperature at furnace rate, which is typically from 2° C. to 3° C. per minute.

The glass was then heat treated in ambient air electric ovens to increase its absorbance in the visible and NIR wavelength regimes. These heat treatments included heating the glass at a ramp rate between 5° C. to 10° C. per minute to a hold temperature that ranges from 500° C. to 650° C. and holding for duration of between 8 and 16 hours. The glass was then cooled to a temperature between 400° C. and 475° C. at a ramp rate between 0.1° C. and 1° C. per minute. The glass was then further cooled to room temperature at furnace rate.

Example 2

A glass-ceramic article having the composition of Sample 54 was laser bleached using a mid-IR wavelength according to the principles of the disclosure. FIG. 3A is a photograph of the glass-ceramic article 300 after it has been laser bleached to form a transparent aperture 304 in the opaque bulk glass composition 308 through the thickness of the article. The article 300 was exposed with a focused laser beam having a wavelength of 2.62 um and 12 W continuous power. The irradiation pattern was formed by multiple lines rastered at 30 mm/s. FIG. 3B is a photograph of the glass-ceramic article 300 of FIG. 3A after subsequent heat treatment at 400° C. for 2 hours. A minimal change in transmission and color through the aperture 304 is observed when comparing FIGS. 3A and 3B.

Example 3

A glass-ceramic article having the composition of Sample 56 was laser bleached using a mid-IR wavelength according to the principles of the disclosure. FIG. 4A is a photograph of the glass-ceramic article 400 after it has been laser bleached to form a transparent aperture 404 in the opaque bulk glass composition 408 through the thickness of the article. The article 400 was exposed with a focused laser beam having a wavelength of 2.68 um and 18 W continuous power. The irradiation pattern was formed by multiple lines rastered at 30 mm/s. FIG. 4B is a photograph of the glass-ceramic article 400 of FIG. 4A after subsequent heat treatment at 400° C. for 2 hours. A minimal change in transmission and a minor change in color (i.e., a blue tint) through the aperture 404 are observed when comparing FIGS. 4A and 4B.

Example 4

Figure 5A:
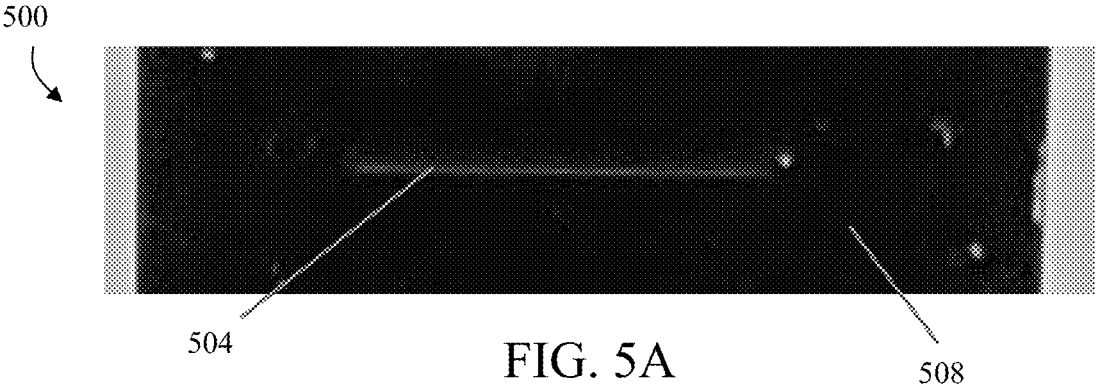
FIGS. 5A-5C are photographs of an article that was laser bleached with a focused, moving beam using a mid-IR wavelength according to the principles of the disclosure, the article comprising a transparent louver bleached at an angle into an opaque bulk formed from the glass composition of Sample 56.
Figure 5B:
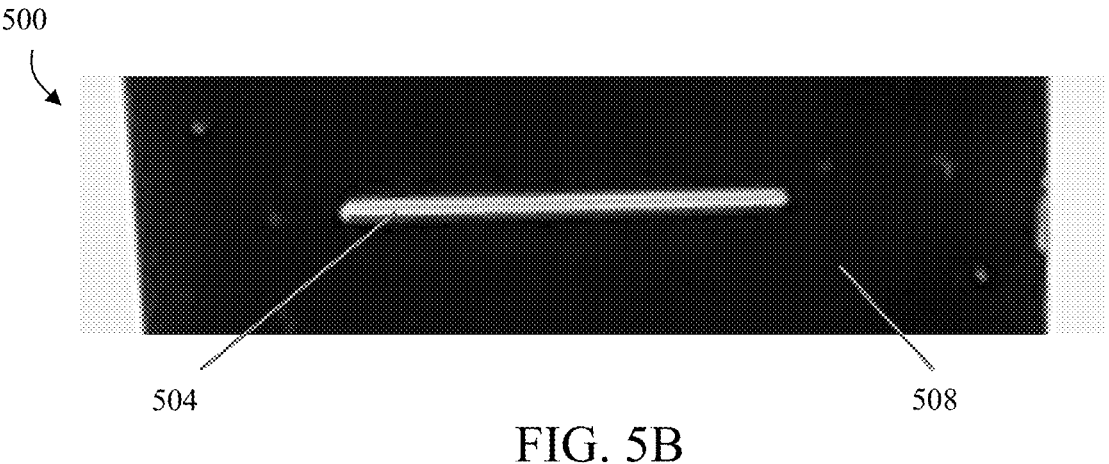
Figure 5C:
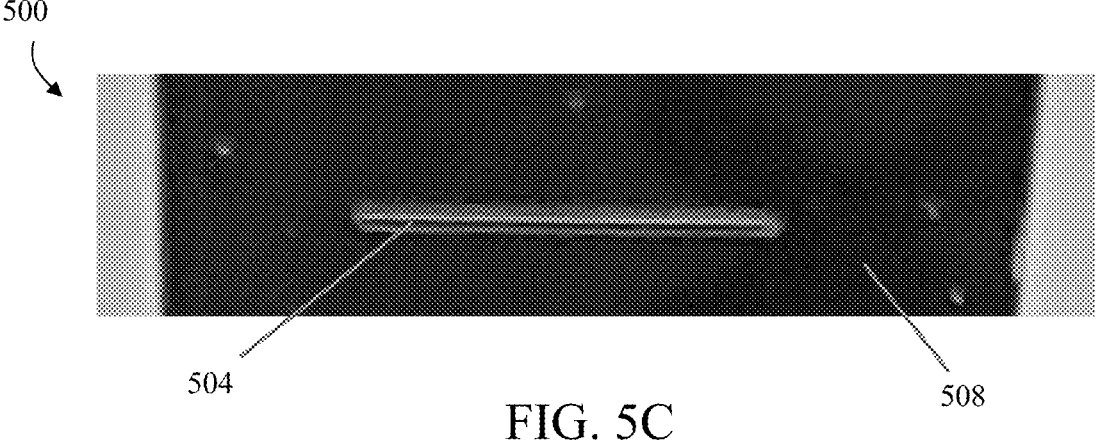

A glass-ceramic article having the composition of Sample 56 was laser bleached using a mid-IR wavelength according to the principles of the disclosure. FIGS. 5A-5C are photographs of the glass-ceramic article 500 at different viewing angles after it has been laser bleached to form a transparent louver 504 in the opaque bulk glass composition 508 through the thickness of the article. The article 500 was exposed with a focused laser beam having a wavelength of 2.63 um and 14 W continuous power. The irradiation pattern was formed by a single scan at 8 mm/s. The louver 504 is oriented at an angle relative to the surface of the article, similar to the louver 37 shown in FIG. 1. The louver 504 of Example 4 is oriented at an angle of approximately 56° relative to the surface of the article. The viewing angle of FIG. 5B is oriented to show maximum visibility through the louver 504. FIGS. 5A and 5C are oriented differently from FIG. 5B to show the change in visibility through the louver 504 when article is positioned at the smaller angle (FIG. 5A) and at the larger angle (FIG. 5C). There was no change in transmission or color through the louver 504 observed after subsequent heat treatment at 400° C. for 2 hours as shown in the photographs of FIGS. 5A-5C.

Example 5

Figure 6B:
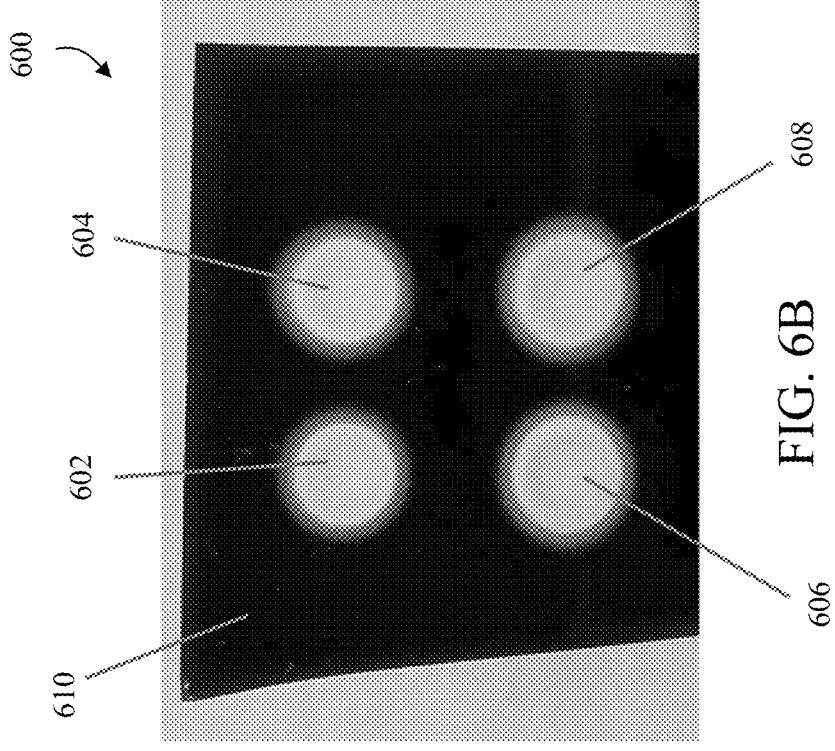
FIG. 6B is a photograph of the article of FIG. 6A after a heat treatment.
Figure 6A:
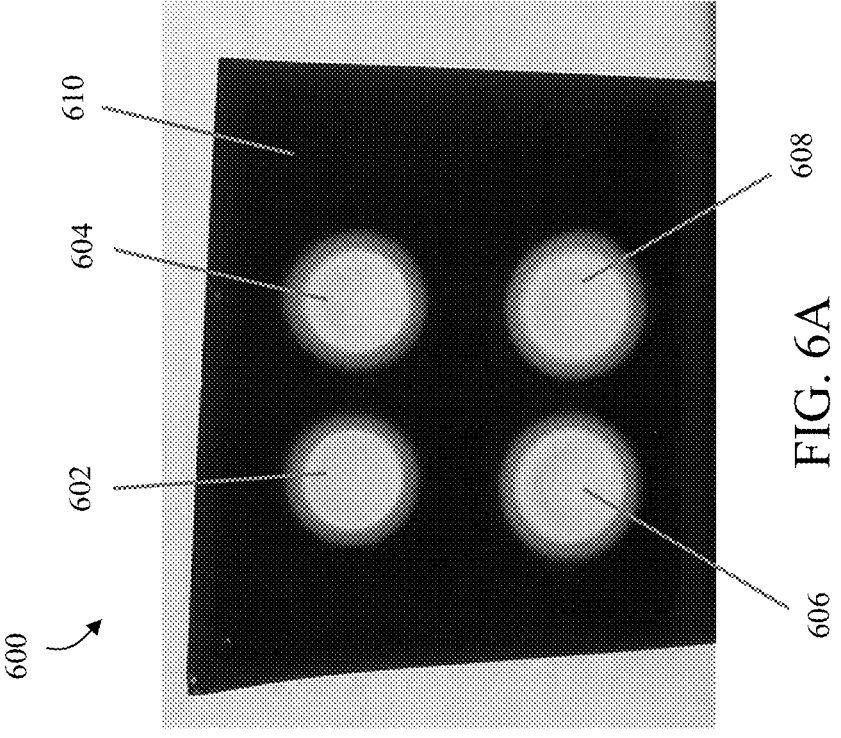
FIG. 6A is a photograph of an article that was laser bleached with a defocused, static beam using a mid-IR wavelength according to the principles of the disclosure, the article comprising a plurality of transparent apertures bleached into an opaque bulk formed from the glass composition of Sample 97.

A glass-ceramic article having the composition of Sample 97 was laser bleached using a mid-IR wavelength according to the principles of the disclosure. FIG. 6A is a photograph of the glass-ceramic article 600 after it has been laser bleached to form a plurality of transparent apertures 602, 604, 606, 608 in the opaque bulk glass composition 610 through the thickness of the article. The two apertures 602, 604 near the top of the photograph were exposed with a focused laser beam having a wavelength of 2.68 um and 18 W continuous power for a duration of 15 s. The two apertures 606, 608 near the bottom of the photograph were exposed with the same beam parameters but for a duration of 20 s. The glass-ceramic article of Example 5 was pre-heated to approximately 350° C. prior to laser bleaching. FIG. 6B is a photograph of the glass-ceramic article 600 of FIG. 6A after subsequent heat treatment at 400° C. for 2 hours. There was no change in transmission or color through the apertures 602, 604, 606, 608 observed when comparing FIGS. 6A and 6B.

Figure 7:
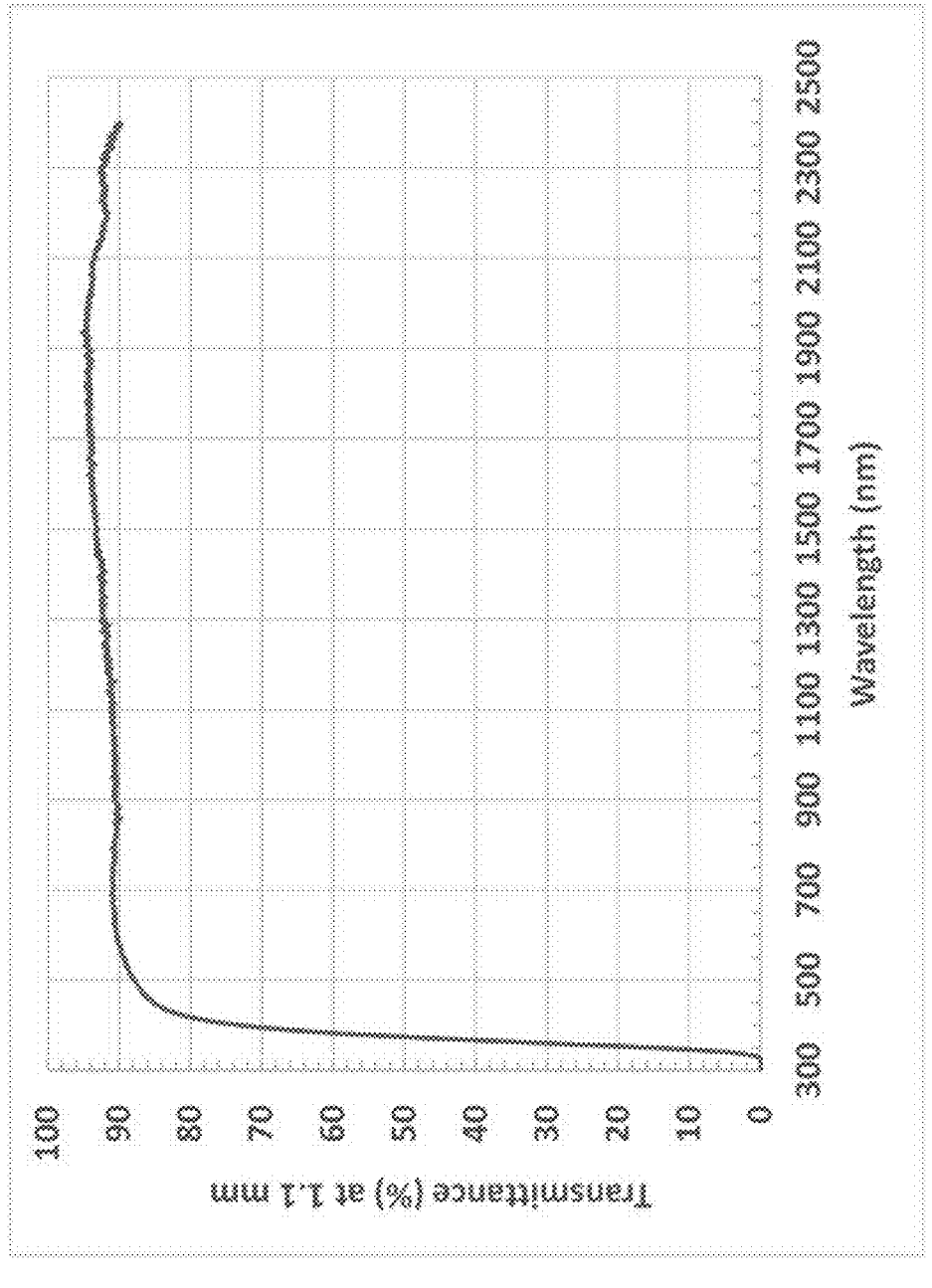
FIG. 7 is a graph of external optical transmittance spectra of a laser bleached region of the bulk of FIG. 6B (Sample 97) over the visible and NIR wavelengths after a heat treatment.
Figure 8:
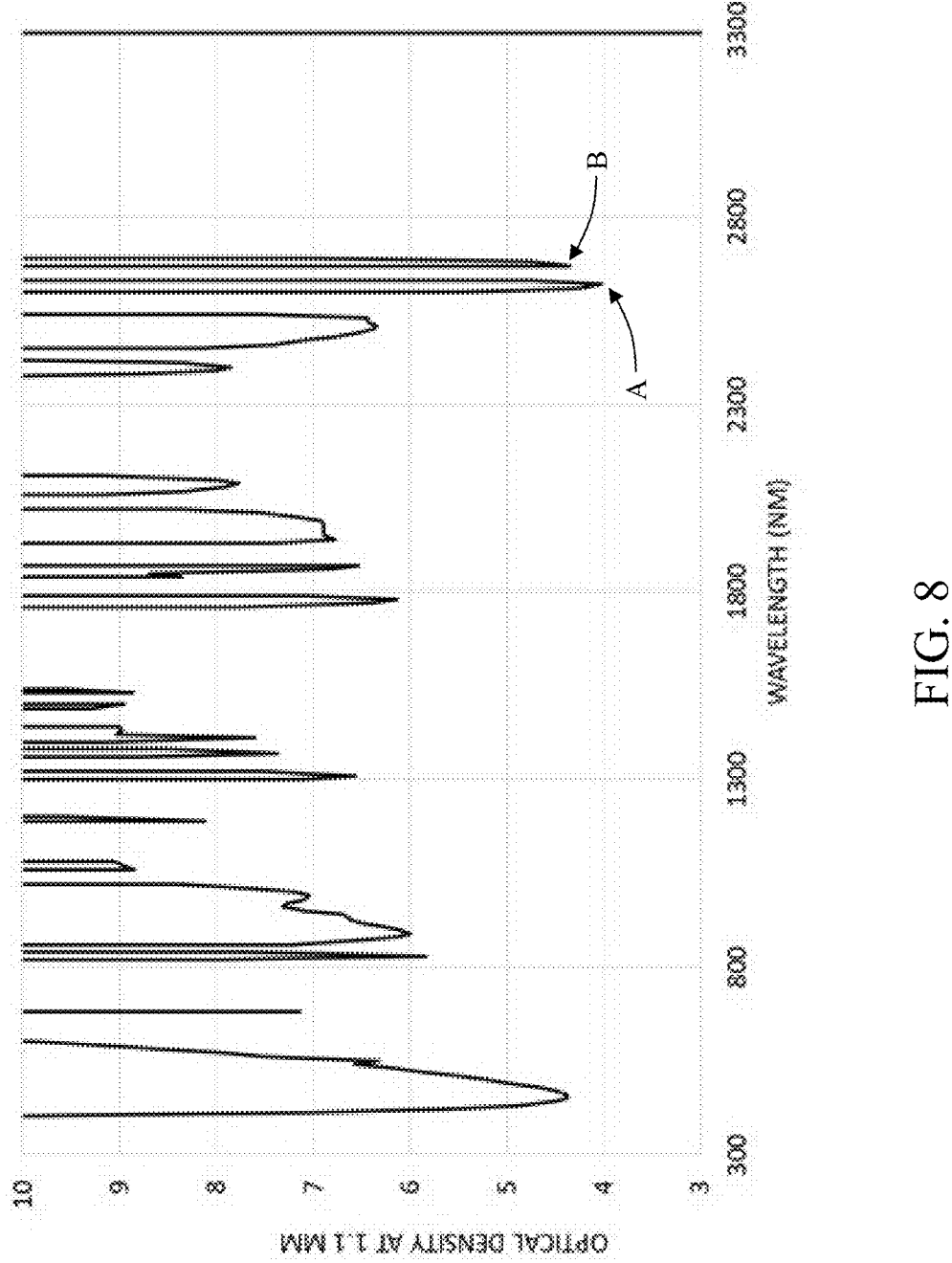
FIG. 8 is graph of absorbance of an un-bleached bulk formed from the glass composition of Sample 62 over the visible and NIR wavelengths in accordance with Example 6.
Figure 9:
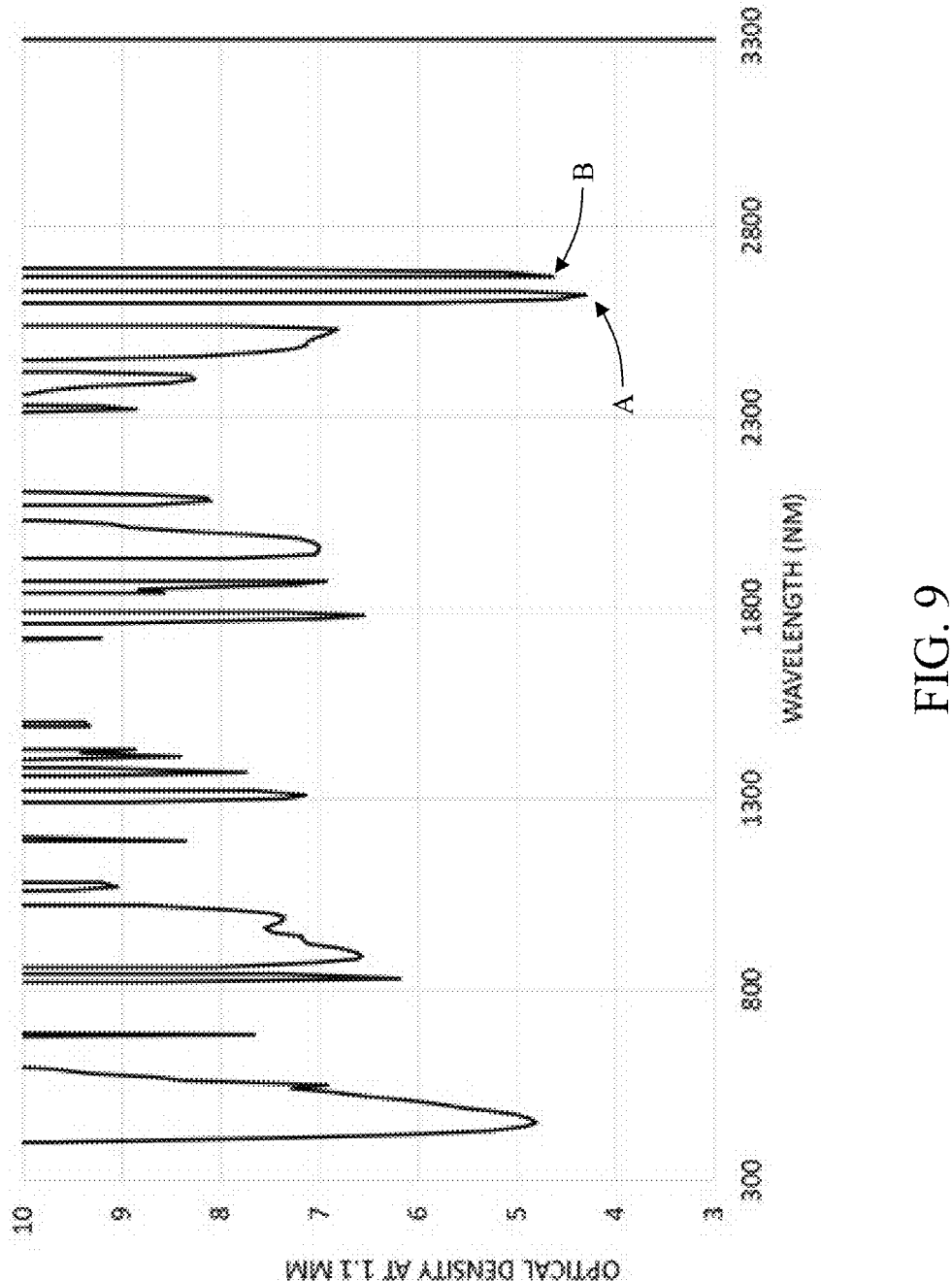
FIG. 9 is graph of absorbance of an un-bleached bulk formed from the glass composition of Sample 75 over the visible and NIR wavelengths in accordance with Example 6.
Figure 10:
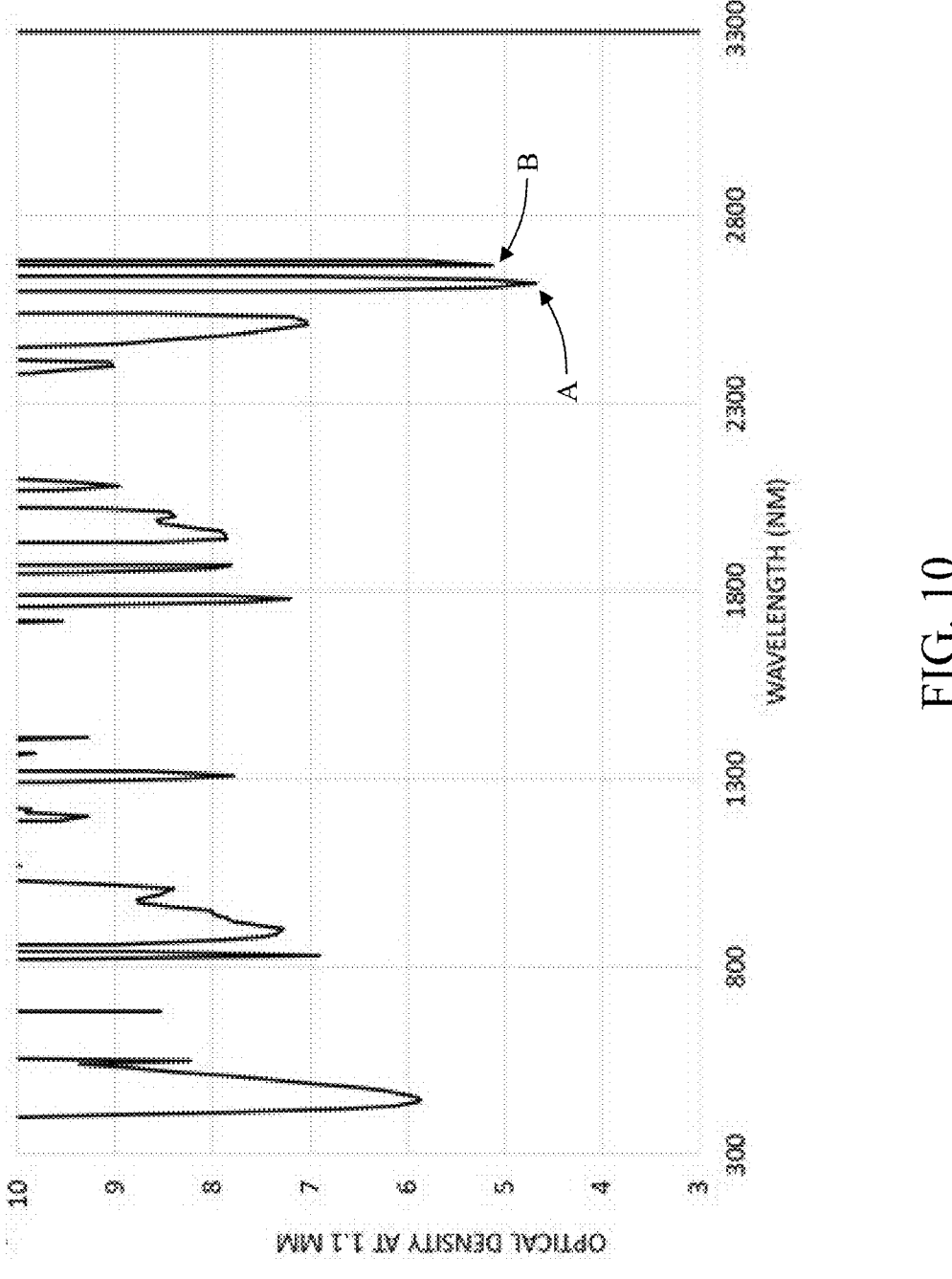
FIG. 10 is graph of absorbance of an un-bleached bulk formed from the glass composition of Sample 77 over the visible and NIR wavelengths in accordance with Example 6.
Figure 11:
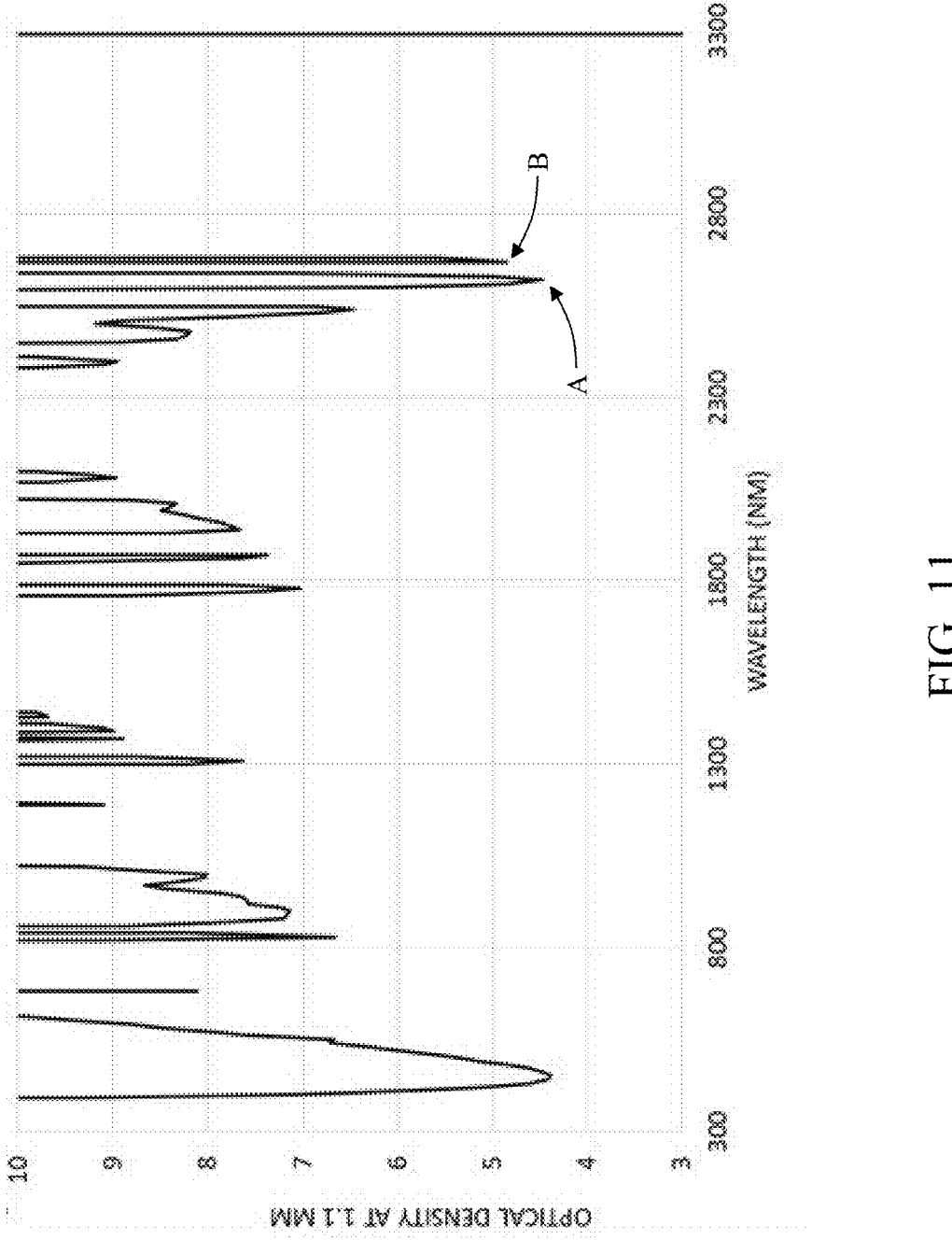
FIG. 11 is graph of absorbance of an un-bleached bulk formed from the glass composition of Sample 90 over the visible and NIR wavelengths in accordance with Example 6.

A graph of external optical transmittance spectra over the visible and NIR wavelengths of one of the bleached apertures 602, 604, 606, 608 of the glass-ceramic article 600 of Example 5 after a heat treatment is shown in FIG. 7. As illustrated in the graph, the bleached and heat treated aperture has a transmittance of at least 70% at a thickness of 1.1 mm over wavelengths from about 400 nm to about 2400 nm. The aperture has a transmittance of at least 88% at the thickness over wavelengths from about 500 nm to about 2400 nm. The aperture has a transmittance of at least 90% at the thickness over wavelengths from about 600 nm to about 2400 nm. The transmittances reported in this example correspond to a "retained transmittance" as defined above since the measurements were taken after the glass-ceramic article of Example 5 with the bleached apertures 602, 604, 606, 608 was heat treated as described in the example.

Example 6

Four articles were prepared to assess the absorbance of certain tungsten bronze glass ceramics disclosed herein. A first article (Example 6-1) had the glass-ceramic composition of Sample 62. A second article (Example 6-2) had the glass-ceramic composition of Sample 75. A third article (Example 6-3) had the glass-ceramic composition of Sample 77. A fourth article (Example 6-4) had the glass-ceramic composition of Sample 90. The glass-ceramic compositions of these articles enable a high contrast ratio between the unbleached and bleached regions of a given article. The articles were cerammed to increase the opacity of the glass-ceramic compositions according to the thermal profiles shown in Table 2. The ceram step for each of the glass-ceramic articles was unique as shown in the Table 2.

TABLE 2

|  | Example 6-1 | Example 6-2 | Example 6-3 | Example 6-4 |
|---|---|---|---|---|
| Heating rate to hold temperature (° C./min) | 10 | 10 | 10 | 10 |
| Hold temperature (° C.) | 525 | 575 | 550 | 550 |
| Hold temperature duration (hrs) | 12 | 12 | 12 | 12 |
| Cooling rate to first cooling temperature (° C./min) | 0.5 | 1 | 1 | 0.5 |
| First cooling temperature (° C.) | 450 | 475 | 475 | 475 |
| Cooling rate to room temperature | Furnace rate | Furnace rate | Furnace rate | Furnace rate |

FIGS. 8-11 are respective graphs of the absorbance of the glass-ceramic compositions of each of the articles of Examples 6-1, 6-2, 6-3, and 6-4, respectively, over the visible and NIR wavelengths at a distance of 1.1 mm after the ceram step but prior to bleaching the articles. As illustrated in the graphs of FIGS. 8-11, the glass-ceramic compositions of each of the articles have an absorbance of at least 4 at a thickness of 1.1 mm over the visible and NIR wavelengths. The transmittance of these examples, determined using the mathematical relationship between absorbance and transmittance, was less than 0.01%. The glass-ceramic compositions of each of the articles of Examples 6-1, 6-2, 6-3, and 6-4 have absorbance minima at wavelengths of 2.62 $\mu$m and 2.68 $\mu$m (see points A and B, respectively, in the figures).

Example 7

Four articles were prepared to evaluate the optical performance of bleached tungsten bronze glass ceramics after subsequent heat treatment. A first article (Example 7-1) had the glass-ceramic composition of Sample 62. A second article (Example 7-2) had the glass-ceramic composition of Sample 75. A third article (Example 7-3) had the glass-ceramic composition of Sample 77. A fourth article (Example 7-4) had the glass-ceramic composition of Sample 90. The glass-ceramic compositions of the articles enable a high contrast ratio between the unbleached and bleached regions of a given article. The articles were cerammed, bleached, and subsequently heat treated according to the thermal profiles and bleaching parameters shown in Table 3.

TABLE 3

|  | Example 7-1 | Example 7-2 | Example 7-3 | Example 7-4 |
|---|---|---|---|---|
| Ceram |  |  |  |  |
| Heating rate to hold temperature (° C./min) | 10 | 10 | 10 | 10 |
| Hold temperature (° C.) | 525 | 550 | 550 | 550 |
| Hold temperature duration (hrs) | 12 | 12 | 12 | 12 |
| Cooling rate to first cooling temperature (° C./min) | 0.5 | 1 | 1 | 0.5 |
| First cooling temperature (° C.) | 450 | 475 | 475 | 475 |
| Cooling rate to roomtemperature | Furnace rate | Furnace rate | Furnace rate | Furnace rate |
| Bleach |  |  |  |  |
| Bleaching type | Gas-oxygen flame | Gas-oxygen flame | Gas-oxygen flame | Gas-oxygen flame |
| Heat Treatment |  |  |  |  |
| Hold temperature 1 (° C.) | 400 | 400 | 400 | 400 |
| Hold temperature 1 duration (hrs) | 2 | 2 | 2 | 2 |
| Hold temperature 2 (° C.) | n/a | 380 | n/a | 380 |
| Hold temperature 2 duration (hrs) | n/a | 14 | n/a | 14 |

Figure 12:
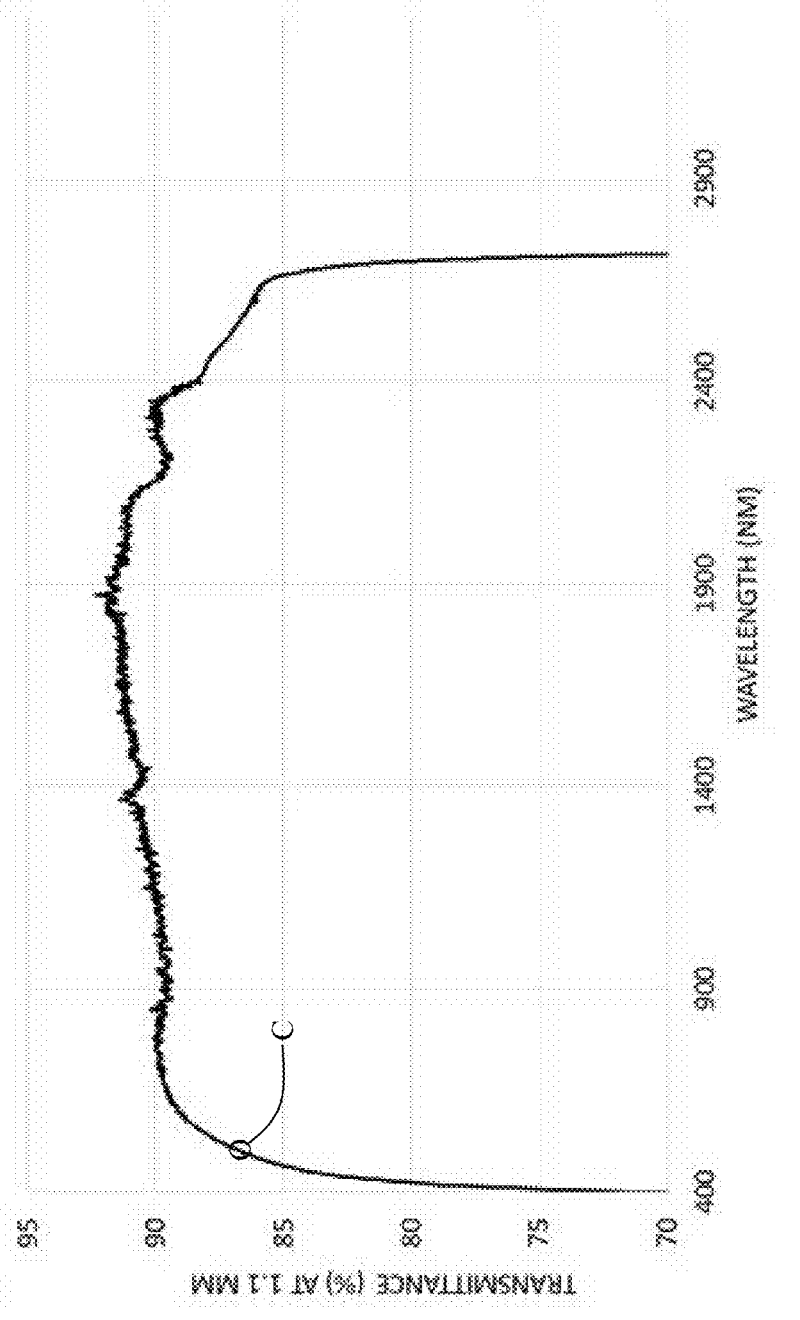
FIG. 12 is a graph of external optical transmittance spectra of a flame bleached region of the bulk of FIG. 8 (Sample 62) over the visible and NIR wavelengths after a heat treatment in accordance with Example 7.
Figure 13:
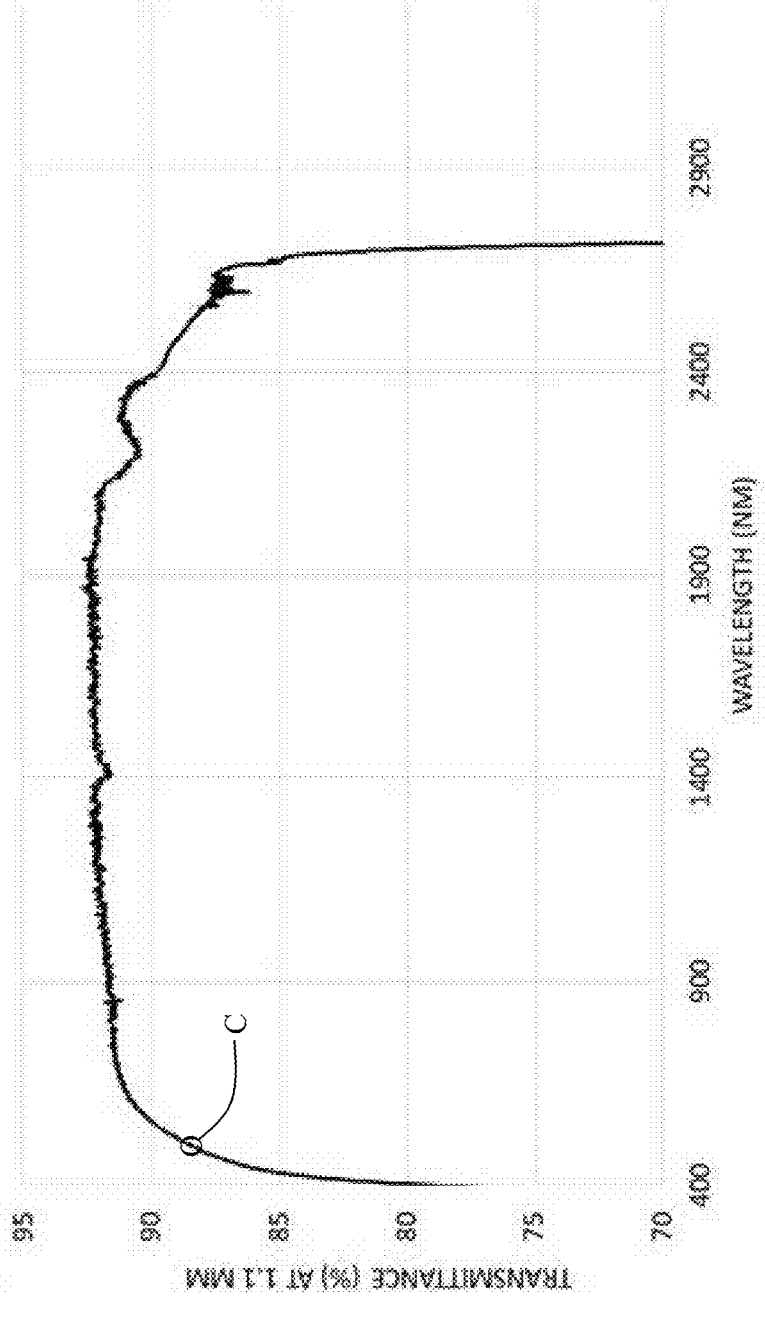
FIG. 13 is a graph of external optical transmittance spectra of a flame bleached region of the bulk of FIG. 9 (Sample 75) over the visible and NIR wavelengths after a heat treatment in accordance with Example 7.
Figure 14:
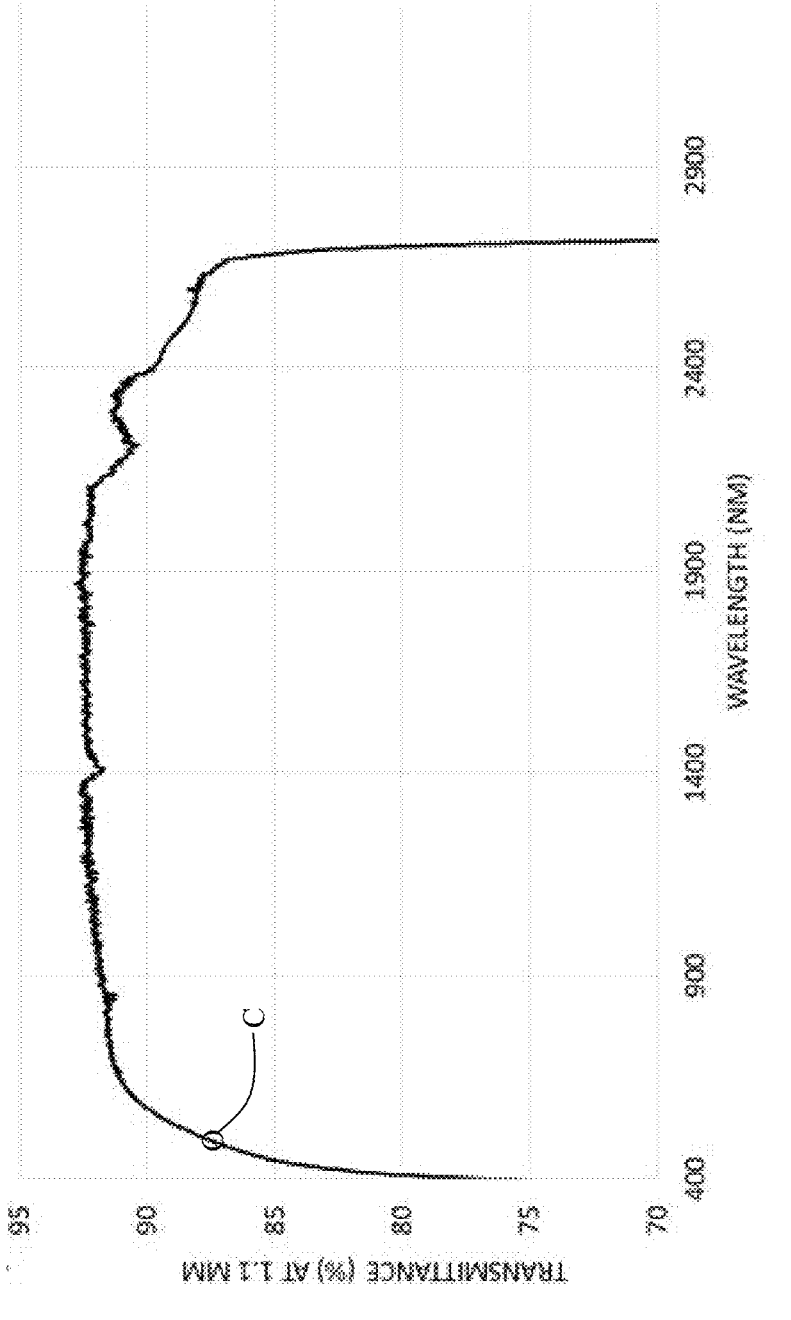
FIG. 14 is a graph of external optical transmittance spectra of a flame bleached region of the bulk of FIG. 10 (Sample 77) over the visible and NIR wavelengths after a heat treatment in accordance with Example 7.
Figure 15:
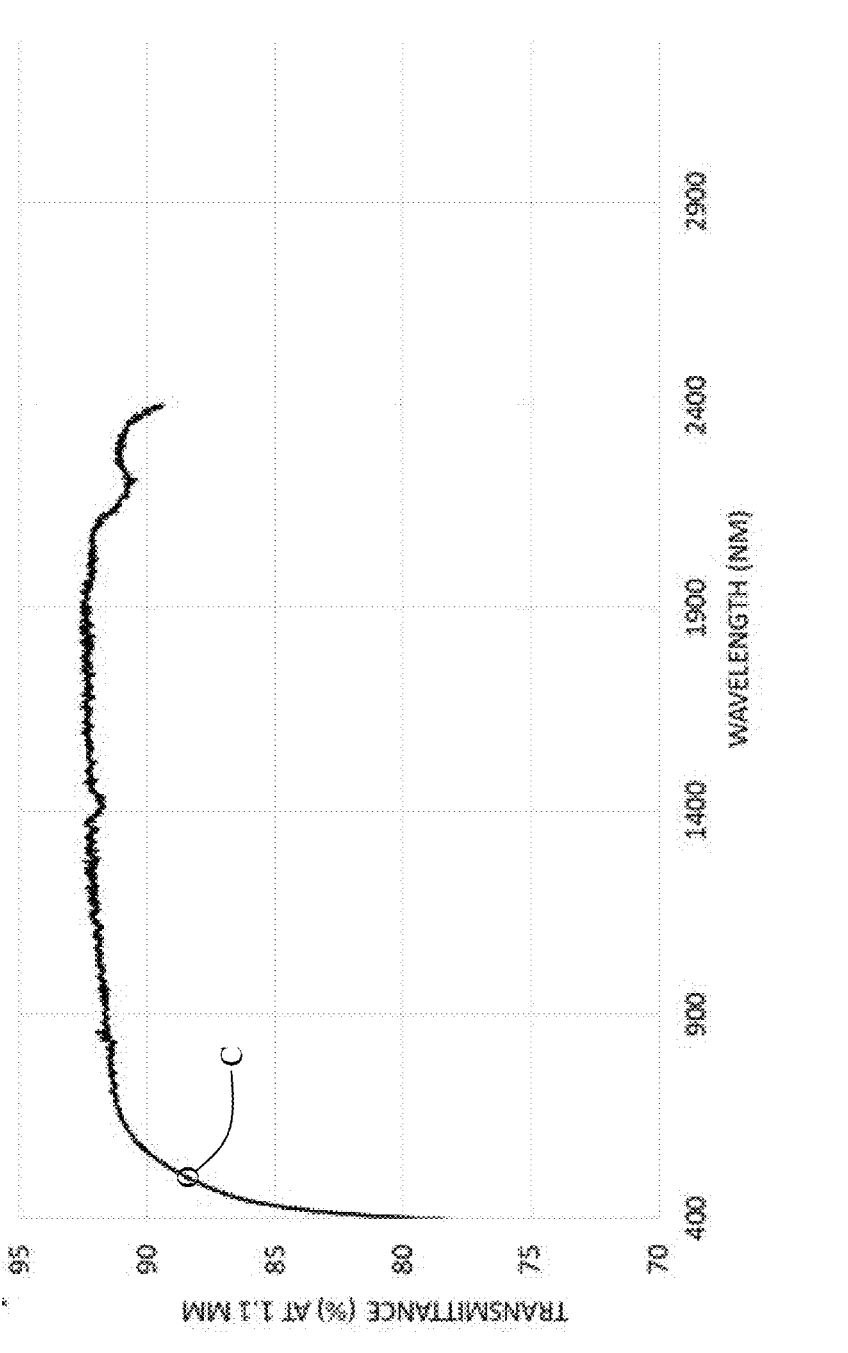
FIG. 15 is a graph of external optical transmittance spectra of a flame bleached region of the bulk of FIG. 11 (Sample 90) over the visible and NIR wavelengths after a heat treatment in accordance with Example 7.

FIGS. 12-15 are respective graphs of transmittance through bleached regions of the glass-ceramic compositions of each of the articles of Examples 7-1, 7-2, 7-3, and 7-4, respectively, over the visible and NIR wavelengths at a distance of 1.1 mm after a subsequent heat treatment. As illustrated in the graphs, the bleached and heat treated regions of each of the articles of Examples 7-1, 7-2, 7-3, and 7-4 has a transmittance of at least 70% at a thickness of 1.1 mm over wavelengths from about 400 nm to about 2400 nm. The bleached region of the article of Example 7-1 has a transmittance of at least 86% over wavelengths from 500 nm (see point C in the figure) to 1100 nm as shown in FIG. 12. The bleached region of the article of Example 7-2 has a transmittance of at least 88% over wavelengths from 500 nm (see point C in the figure) to 1100 nm as shown in FIG. 13. The bleached region of the article of Example 7-3 has a transmittance of at least 87% over wavelengths from 500 nm (see point C in the figure) to 1100 nm as shown in FIG. 14. The bleached region of the article of Example 7-4 has a transmittance of at least 88% over wavelengths from 500 nm (see point C in the figure) to 1100 nm as shown in FIG. 15. The transmittances reported in this example correspond to a "retained transmittance" as defined above since the measurements were taken after the glass-ceramic articles of each of Examples 7-1, 7-2, 7-3, and 7-4 with the bleached regions were heat treated as described in the example.

Example 8

Figure 16:
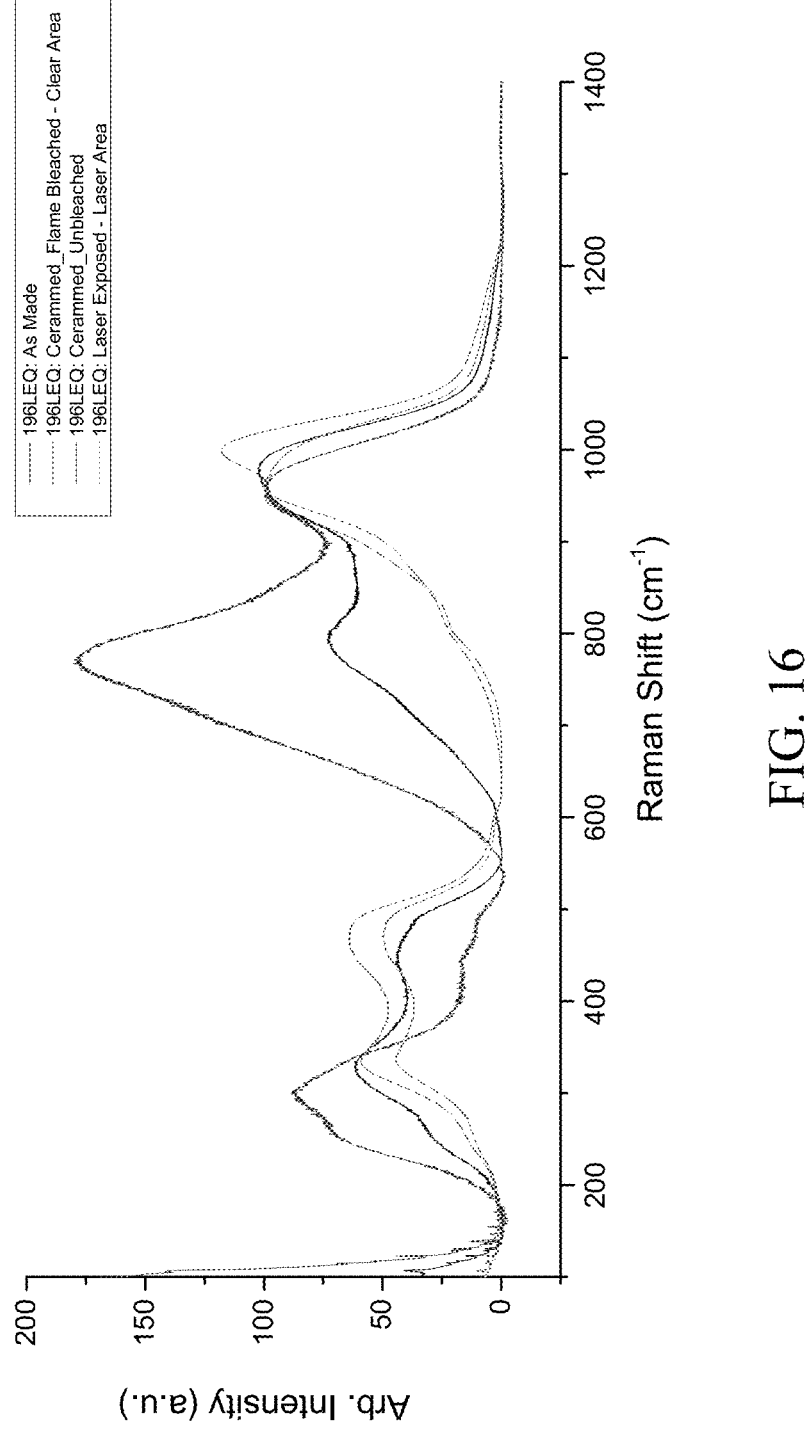
FIG. 16 is a graph of Raman spectra of samples formed from the glass composition of Sample 56 with measurements taken in the as made bulk, the cerammed and unbleached bulk, a flame bleached area, and a laser bleached area.

Articles were prepared to compare the difference in the concentration of tungsten in the glass matrix between a flame bleached sample and sample that was laser bleached with a 2.62 μm laser. Both articles had the glass-ceramic composition of Sample 56. FIG. 16 is a graph of Raman spectra taken in the as made bulk, the cerammed unbleached bulk, a flame bleached area, and a laser bleached area. The difference in the concentration of tungsten in the glass matrix between the flame bleached sample and the laser bleached sample is shown by comparing the peak corresponding to $WO^{4-}$ (around 1000 cm-1) in FIG. 16. This confirms that laser bleaching at 2.5 μm to 2.62 μm returns less tungsten in the glass matrix than flame bleaching.

The laser bleaching techniques and glass-ceramic compositions disclosed herein enable numerous attributes and advantages, including through-thickness uniformly bleached features with resolution in the tens of microns; apertures with high visible transmittance greater than 85% at visible and NIR wavelengths; louvers bleached on an angle relative to the sample surface, which may improve the signal to noise ratio of certain types sensors; hermetic monolithic parts with both clear and opaque apertures; chemically strengthened parts with both clear and opaque apertures providing strength, scratch resistance, and safe break patterns; laser writing speeds of 30 mm/s or more; reconfigurable bleached patterns with application of specific thermal treatments; and absorbance of visible and IR in the unbleached state.

The laser bleaching techniques disclosed herein also prevent the loss of transmittance in the bleached region(s) of samples made from the high contrast ratio glass-ceramic compositions disclosed herein during subsequent heat treatment, such as annealing and/or chemical strengthening via ion exchange. This enables practical use of these compositions for a variety of applications requiring transparent apertures with good optical isolation therebetween.

While the disclosure has been illustrated and described in detail in the drawings and foregoing description, the same should be considered as illustrative and not restrictive in character. It is understood that only the preferred embodiments have been presented and that all changes, modifications, and further applications that come within the spirit of the disclosure are desired to be protected.

What is claimed is:

1. A method of bleaching a glass-ceramic article, comprising:
   irradiating a glass-ceramic article with a beam from a laser, the glass-ceramic article comprising a bulk having an amorphous silicate glass phase and a crystalline phase, the irradiating a glass-ceramic article comprising directing the beam of the laser into a thickness of the glass-ceramic article to form an aperture in the bulk, the beam comprising a wavelength configured to couple into respective absorption bands of the crystalline phase and/or of other constituents of the bulk,
   wherein a ratio between a transmittance of the aperture and a transmittance of the bulk is at least 7,000 at first wavelengths from 500 nm to 1100 nm; and
   wherein the wavelength of the beam of the laser is within a range of 2 μm and 3 um.

2. The method of claim 1, wherein the transmittance of the aperture is at least 70%/mm at the first wavelengths.

3. The method of claim 1, wherein the transmittance of the bulk is less than 0.01%/mm at the first wavelengths.

4. The method of claim 1, wherein the transparent bleached region has a resolution of about 20 μm in a direction perpendicular to the thickness.

5. The method of claim 4, wherein the transparent bleached region has the resolution along an entirety of the thickness.

6. The method of claim 1, wherein the crystalline phase comprises a species of $M_xWO_3$ where $0<x<1$ and where M is an intercalated dopant cation, the wavelength of the beam of the laser coupling to the absorption band of the species of $M_xWO_3$ during the irradiating.

7. The method of claim 1, wherein the other constituents of the bulk comprise chemical hydroxyl groups, and wherein the wavelength of the beam is configured to couple into an absorption band of the chemical hydroxyl groups in the bulk.

8. The method of claim 1, wherein the directing the beam of the laser comprises directing a focused, moving beam within the thickness of the glass-ceramic article to form the aperture in the bulk.

9. The method of claim 1, wherein the directing the beam of the laser comprises directing a defocused, static beam through the thickness of the glass-ceramic article to form the aperture in the bulk.

10. The method of claim 1, further comprising heat treating the glass-ceramic article to 400° C. for 1 hour after the irradiating, the aperture having a retained transmittance of at least 50%/mm at the first wavelengths after the heating treating.

11. The article of claim 10, wherein the aperture has a transmittance of at least 80%/mm and a retained transmittance of at least 70%/mm at the first wavelengths.

12. The method of claim 10, wherein the transmittance of the bulk is less than 0.01%/mm at the first wavelengths.

13. The method of claim 1, further comprising ion exchanging the glass-ceramic article in a bath comprising sodium nitrate and/or potassium nitrate between a temperature of 360 and 450° C. for between 0.25 and 25 hours, the aperture having a retained transmittance of at least 50%/mm at the first wavelengths after the ion exchanging.

* * * * *